United States Patent
Cordell

(10) Patent No.: US 10,882,398 B2
(45) Date of Patent: Jan. 5, 2021

(54) SYSTEM AND METHOD FOR CORRELATING USER ATTENTION DIRECTION AND OUTSIDE VIEW

(71) Applicant: Xevo Inc., Bellevue, WA (US)

(72) Inventor: John P. Cordell, Seattle, WA (US)

(73) Assignee: XEVO INC., Bellevue, WA (US)

(*) Notice: Subject to any disclaimer, the term of this patent is extended or adjusted under 35 U.S.C. 154(b) by 0 days.

(21) Appl. No.: 16/275,294

(22) Filed: Feb. 13, 2019

(65) Prior Publication Data
US 2020/0254876 A1    Aug. 13, 2020

(51) Int. Cl.
| | |
|---|---|
| *B60K 35/00* | (2006.01) |
| *G06K 9/00* | (2006.01) |
| *G06T 7/70* | (2017.01) |
| *H04N 7/18* | (2006.01) |
| *B60Q 9/00* | (2006.01) |

(52) U.S. Cl.
CPC ............... *B60K 35/00* (2013.01); *B60Q 9/00* (2013.01); *G06K 9/00791* (2013.01); *G06K 9/00845* (2013.01); *G06T 7/70* (2017.01); *H04N 7/181* (2013.01); *B60K 2370/1868* (2019.05); *B60K 2370/52* (2019.05); *B60K 2370/736* (2019.05); *G06T 2207/30201* (2013.01); *G06T 2207/30252* (2013.01)

(58) Field of Classification Search
CPC .... G08G 1/166; B60Q 9/008; B60Q 2300/45; B60Q 1/085; B60Q 9/00; B60W 50/14; B60K 35/00; G06K 9/00845; G06K 9/00791; G06T 7/70; H04N 7/181
See application file for complete search history.

(56) References Cited

U.S. PATENT DOCUMENTS

| | | | |
|---|---|---|---|
| 7,119,832 B2 | 10/2006 | Blanco et al. | |
| 8,098,170 B1* | 1/2012 | Szczerba | G02B 27/01 340/438 |
| 8,593,301 B2 | 11/2013 | Newman | |
| 8,824,779 B1* | 9/2014 | Smyth | G06T 7/593 382/154 |

(Continued)

FOREIGN PATENT DOCUMENTS

| | | | | |
|---|---|---|---|---|
| DE | 102007045932 A1 * | 4/2009 | ............. | G08G 1/161 |
| EP | 1961622 A1 * | 8/2008 | ............. | G08G 1/166 |

(Continued)

OTHER PUBLICATIONS

U.S. Appl. No. 15/672,897, filed Aug. 9, 2017, "Method and Apparatus for Providing Automatic Mirror Setting via Inward Facing Cameras," first named inventor: John Palmer Cordell.

(Continued)

*Primary Examiner* — David E Harvey
(74) *Attorney, Agent, or Firm* — Seed IP Law Group LLP

(57) ABSTRACT

Embodiments are directed towards providing a system that presents customized content to a user of an automobile based on what the user of the automobile is looking at. A first camera captures images of the user of the interior of the automobile, and a second camera captures images of a scene that the user is viewing. The images are analyzed to determine if the user is looking at, or not looking at, an object in the scene. If the user is looking at such an object, content associated with the object is selected and presented to the user.

13 Claims, 7 Drawing Sheets

(56) References Cited

U.S. PATENT DOCUMENTS

| | | | |
|---|---|---|---|
| 8,965,037 B2* | 2/2015 | Levin | G06K 9/00604 |
| | | | 382/100 |
| 9,057,874 B2* | 6/2015 | Seder | G02B 27/01 |
| 9,613,459 B2* | 4/2017 | Ng-Thow-Hing | G06T 19/006 |
| 9,760,827 B1 | 9/2017 | Lin et al. | |
| 9,791,286 B2* | 10/2017 | Di Censo | G01C 21/3626 |
| 9,975,483 B1* | 5/2018 | Ramaswamy | B60W 40/08 |
| 2003/0039378 A1* | 2/2003 | Yuasa | G06T 7/74 |
| | | | 382/104 |
| 2004/0150514 A1* | 8/2004 | Newman | G08G 1/166 |
| | | | 340/435 |
| 2004/0178890 A1* | 9/2004 | Williams | B60Q 1/52 |
| | | | 340/425.5 |
| 2005/0073136 A1* | 4/2005 | Larsson | A61B 5/163 |
| | | | 280/735 |
| 2007/0182528 A1 | 8/2007 | Breed et al. | |
| 2008/0033638 A1* | 2/2008 | Hirayama | G01C 21/3632 |
| | | | 701/532 |
| 2008/0077321 A1* | 3/2008 | Widodo | G01C 21/32 |
| | | | 701/29.5 |
| 2008/0186210 A1 | 8/2008 | Tseng | |
| 2008/0239527 A1 | 10/2008 | Okabe et al. | |
| 2009/0058678 A1* | 3/2009 | Matsuoka | G02B 27/01 |
| | | | 340/904 |
| 2009/0303078 A1* | 12/2009 | Mochizuki | B60W 40/02 |
| | | | 340/901 |
| 2009/0319178 A1* | 12/2009 | Khosravy | G01C 21/20 |
| | | | 701/408 |
| 2010/0080416 A1 | 4/2010 | Lee et al. | |
| 2010/0185390 A1 | 7/2010 | Monde et al. | |
| 2011/0313593 A1 | 12/2011 | Cohen et al. | |
| 2012/0224060 A1* | 9/2012 | Gurevich | B60R 1/00 |
| | | | 348/148 |
| 2012/0299344 A1 | 11/2012 | Breed et al. | |
| 2013/0030811 A1* | 1/2013 | Olleon | G06F 3/013 |
| | | | 704/267 |
| 2013/0050258 A1* | 2/2013 | Liu | G06F 3/005 |
| | | | 345/633 |
| 2014/0168056 A1* | 6/2014 | Swaminathan | G06F 3/147 |
| | | | 345/156 |
| 2014/0210978 A1* | 7/2014 | Gunaratne | G06K 9/00845 |
| | | | 348/77 |
| 2015/0006278 A1* | 1/2015 | Di Censo | G06K 9/00845 |
| | | | 705/14.43 |
| 2015/0073664 A1 | 3/2015 | Petridis et al. | |
| 2015/0092056 A1 | 4/2015 | Rau et al. | |
| 2015/0154461 A1* | 6/2015 | Kitaura | G06K 9/00604 |
| | | | 348/148 |
| 2015/0324645 A1* | 11/2015 | Jang | G06F 1/163 |
| | | | 345/633 |
| 2015/0345981 A1* | 12/2015 | Goldman-Shenhar | |
| | | | G01C 21/3629 |
| | | | 701/533 |
| 2016/0065903 A1 | 3/2016 | Wang et al. | |
| 2016/0117947 A1* | 4/2016 | Misu | G09B 9/04 |
| 2016/0176339 A1* | 6/2016 | Aimura | B60Q 9/008 |
| | | | 701/301 |
| 2016/0203629 A1* | 7/2016 | Takeda | G01C 21/36 |
| | | | 345/632 |
| 2016/0207455 A1* | 7/2016 | Kim | B60K 28/066 |
| 2016/0272215 A1* | 9/2016 | Laine | G08G 1/166 |
| 2016/0297449 A1* | 10/2016 | Heim | B60W 30/08 |
| 2016/0362111 A1* | 12/2016 | Jones | G08B 21/06 |
| 2016/0379497 A1* | 12/2016 | Hatakeyama | G08G 1/166 |
| | | | 340/435 |
| 2017/0043781 A1* | 2/2017 | Prakah-Asante | B60W 40/08 |
| 2017/0076503 A1* | 3/2017 | Tamaoki | G06F 3/0482 |
| 2017/0108925 A1* | 4/2017 | Mueller | B60W 40/08 |
| 2017/0187963 A1* | 6/2017 | Lee | G06F 3/013 |
| 2017/0311903 A1 | 11/2017 | Davis et al. | |
| 2017/0330042 A1* | 11/2017 | Vaziri | G06K 9/00604 |
| 2017/0364147 A1* | 12/2017 | Canella | G06F 3/013 |
| 2018/0046851 A1* | 2/2018 | Kienzle | G06F 3/0481 |
| 2018/0086265 A1* | 3/2018 | Landfors | B60Q 9/008 |
| 2018/0129891 A1* | 5/2018 | Ryu | B60W 40/04 |
| 2019/0043327 A1* | 2/2019 | Stent | G06K 9/00805 |
| 2019/0047582 A1* | 2/2019 | Anderson | G05D 1/0094 |
| 2019/0126821 A1* | 5/2019 | Ho | G06F 3/04842 |
| 2019/0180485 A1* | 6/2019 | Kim | B60R 1/00 |
| 2019/0204598 A1* | 7/2019 | Murai | B60K 35/00 |
| 2019/0228242 A1* | 7/2019 | Yamaoka | G06K 9/00845 |
| 2019/0248374 A1* | 8/2019 | Aizawa | B60W 30/182 |
| 2019/0318181 A1* | 10/2019 | Katz | B62D 1/02 |
| 2019/0359121 A1* | 11/2019 | Shimada | H04N 5/247 |
| 2019/0374151 A1* | 12/2019 | Paudel | B60W 40/09 |
| 2020/0018952 A1* | 1/2020 | Lewis | G02B 27/0179 |
| 2020/0139965 A1* | 5/2020 | Hanna | G06K 9/00805 |
| 2020/0143562 A1* | 5/2020 | Jiang | G06T 7/74 |
| 2020/0159214 A1* | 5/2020 | Misu | G05D 1/0088 |

FOREIGN PATENT DOCUMENTS

| | | | |
|---|---|---|---|
| JP | 2009146086 A | | 7/2009 |
| JP | 2016057959 A | | 4/2016 |
| JP | 2017122640 A | * | 7/2017 |
| KR | 1020150137264 A | | 12/2015 |
| WO | 2013005912 A1 | | 1/2013 |
| WO | WO-2020023926 A1 | * | 1/2020 | G06K 9/00 |

OTHER PUBLICATIONS

Non-Final Office Action dated May 15, 2019 for U.S. Appl. No. 15/672,897, filed Aug. 9, 2017, 48 pages.

* cited by examiner

SYSTEM AND METHOD FOR CORRELATING USER ATTENTION DIRECTION AND OUTSIDE VIEW

TECHNICAL FIELD

The present disclosure relates generally to the dynamic, real-time selection and presentation of content to a person in an automobile based on what the person is looking at.

BACKGROUND

Description of the Related Art

Automobiles are becoming more and more user friendly and interactive. Many new cars are now manufactured with a user interface, called a head unit, which a user can use to control various aspects of the automobile and access a variety of content or applications. For example, the user can use the head unit to change radio stations, change the temperature of the automobile cabin, access maps and global positioning systems, access the internet, access other head-unit applications, or access or control other accessories of the automobile. The head unit can also provide various types of information or content to the user, such as when the automobile is due for an oil change or when a tire rotation should be performed, to name a few. Most of this information, however, is provided to the user without any basis on the context of the operation of the automobile.

BRIEF SUMMARY

Briefly stated, embodiments are directed towards a system and method of presenting customized content to a user of an automobile based on what the user of the automobile is looking at. A first camera captures images of the user of the automobile, and a second camera captures images of a scene that the user is viewing. The images are analyzed to determine if the user is looking at, or not looking at, an object in the scene. If the user is looking at an object of interest, content associated with the object is selected and presented to the user. For example, if the object of interest is a billboard for a restaurant, the head unit can present directions from the automobile's current location to the restaurant.

The user can also be alerted to objects the user should focus on, such as hazardous objects or informational signs. For example, the images captured by the first and second cameras may be analyzed to determine if there is a hazardous object present, such as an animal or car stopped in the road, and if so, if the user is looking at the hazardous object. Similarly, the images captured by the first and second cameras may be analyzed to determine if there is an information sign present, such as a traffic-direction, detour, or speed-limit sign, and if so, if the user is looking at the informational sign. If the user is the driver and is not looking at the hazardous object or the informational sign, a warning or alert can be presented to the driver to draw the driver's attention to the hazardous object or informational sign.

Accordingly, content can be customized specifically for the user based on what they are looking at or items they should be looking at but are not, without the user having to perform additional commands or input to request such content.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings.

DETAILED DESCRIPTION

Figure 1:
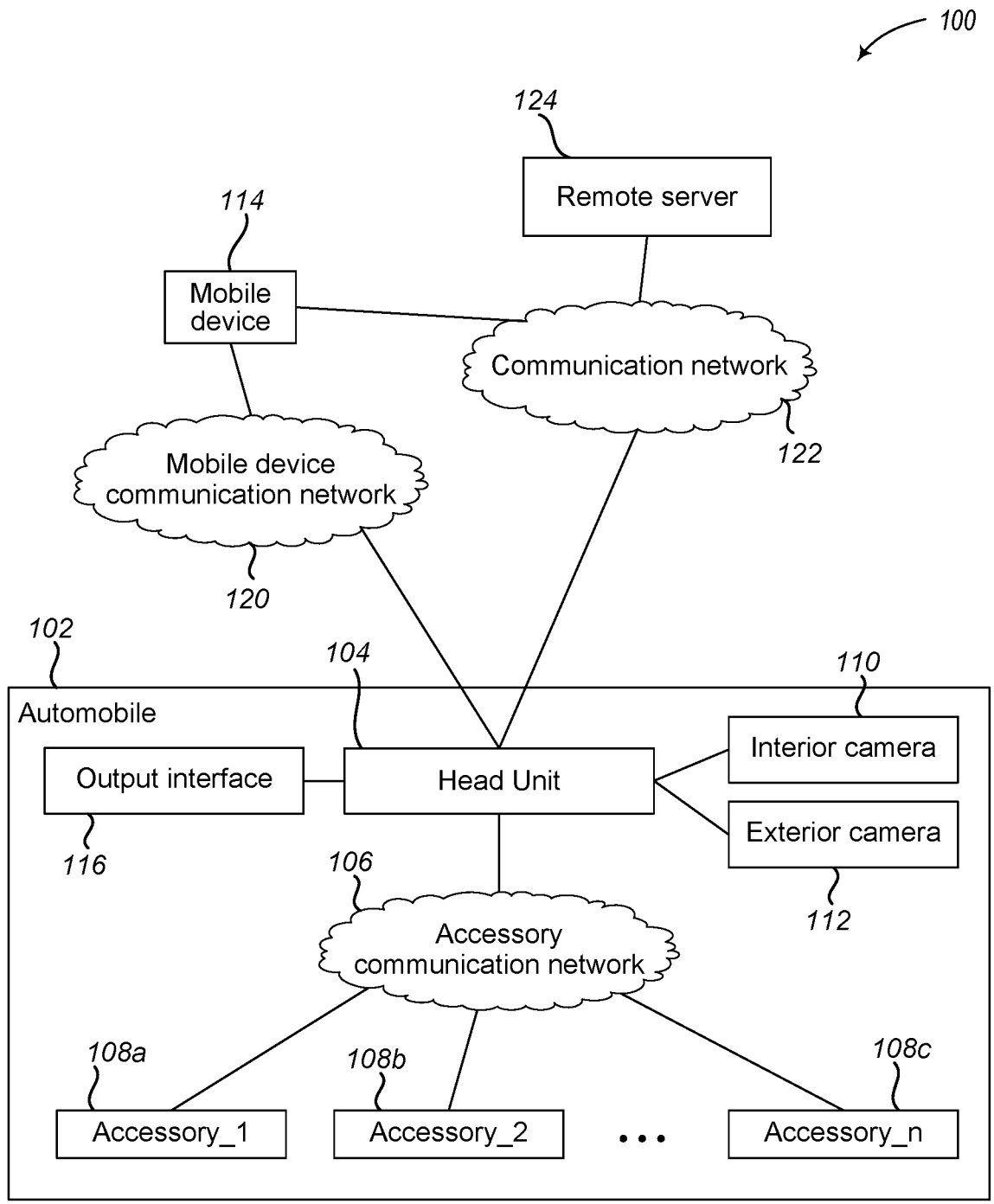
FIG. 1 illustrates a context diagram of an automobile environment that utilizes multiple cameras to monitor a user's attention and what they are looking at to provide content to that user in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

The term "user" is defined as a person or occupant that is in or otherwise transported by a vehicle or in control of the vehicle. The user may be the driver or a passenger of an automobile. An "object" is defined as a real-world thing that a user may perceive and that can be captured or recorded in one or more digital images. An "image" is defined as a set of collection of digital data produced or provided by a camera. A "camera" is defined as a sensor that is sensitive to light and generates signals for creating images. The camera may be sensitive to visible or invisible light (or both).

The term "content" is defined as information related to an object that can be presented to a user of the vehicle. Content may include visual content, audio content, tactile content, or some combination thereof. Visual content can include text, graphics, symbols, video, or other information that is displayed to a user on a display device. Audio content can include songs, vocals, music, chimes, or other types of sounds that are provided to a user via a speaker. Tactile content can include vibrations, pulses, or other types of touch-based sensations provided to the user via a haptic interface. Generalized types of content can include but are not limited to advertisements, sports scores or information, directions, restaurant menus, coupons, descriptive information, emergency instructions, etc.

The term "vehicle" is defined as a device used to transport people or goods (or both), and examples include automobiles, buses, aircraft, boats, or trains. Although most of the following text focuses on an automobile, the application of the concepts described herein is not limited to such a vehicle. A "processor" is defined as a component with at least some circuitry or other hardware that can execute instructions. A "head unit" is defined as one or more components, whether part of a single unit or a collection of units, at least some of which include circuitry, configured to perform computations related to image processing or present content arising from the image processing (or both). A "reference system" is defined as a system of points, angles, locations, objects, or other markers used to determine a position of an object with respect to a vehicle, a user of the vehicle, or some component of or related to the vehicle.

The term "attention direction" is defined as a user's line of sight or principal point (or area) of focus or attention at any given moment. The term "attention position" is defined as data related to user that is used to determine an attention direction of a user, such as the user's line of sight or positioning of one or more body parts of the user (or both). An "object of interest" or a "target object" is defined as an object that aligns with or is otherwise the subject of a user's attention direction. A "hazardous object" is defined as an object that presents danger (including potential danger) to a vehicle or a user. The term "informational sign" is defined as a physical medium that presents information related to the operation of a vehicle or the use of a road or some other route.

Embodiments described herein are generally described as determining if a user is looking, or not looking, at or in a direction towards an object. These embodiments, however, may utilize or employ multiple classifications of how a user is looking at an object. These classifications may be based on an amount of focus or an amount of attention the user is giving to the object. In some embodiments, the classifications may be referred to as attention levels. The attention levels can be measured by several factors. One factor is the amount of time a user is looking at an object. Another factor is the number of times that a user views an object. Yet another factor is the timing of the number of views and different time sequences of each view. In one non-limiting first example, there can be four attention levels based on the amount of time a user is looking at an object: a glimpse, glance, gaze, and stare, with each successive level being associated with an increasing amount of user attention. The direction along which the user is looking may be referred to as the user's attention direction and the aspects giving rise or otherwise contributing to the attention direction may be referred to as the attention position.

A glimpse is when a user sweeps their eyes across an object without pausing. In one embodiment, a glimpse may be identified by the user's eyes being positioned to look at the object for an amount of time less than a first threshold. Conversely, for each of a glance, a gaze, and a stare, a user maintains his or her viewing position on the object for an amount of time equal to or above the first threshold. Accordingly, a glance may be identified by the user's eyes being positioned to look at the object for an amount of time equal to or greater than the first threshold and less than a second threshold. A gaze may be identified by the user's eyes being positioned to look at the object for an amount of time equal to or greater than the second threshold and less than a third threshold. And a stare may be identified by the user's eyes being positioned to look at the object for an amount of time equal to or greater than the third threshold. In various embodiments, the first threshold is referred to as a glance threshold, the second threshold is referred to as a gaze threshold, and the third threshold is referred to as a stare threshold.

In another embodiment, the attention level is based primarily on the number of different or discrete views. If a driver glances at an object, then looks at different locations, and then has more views at the object, regardless of their length, then this sequence of actions may indicate a high-interest level in the object. If the user glimpses at an object and follows that initial act with gazes of it separated from each other by glances at the road or another object, then these events may denote a higher attention level in relation to the object. If the user performs three gazes at an object with two glances in between to look at the road, this sequence may show a higher attention level towards the object than if the user performs two glances and a glimpse at the object with gazes in another direction between the glances. Thus, detecting repeated views of an object by a user, as well as the sequence of the repeated views, may be an indication of the level of interest by the user in the object.

In some embodiments, the time the user is looking at an object may be added together over multiple looks at the object during a select period of time. The cumulative total of these viewing times over a predetermined period may then be compared to the spectrum of thresholds (or other classifications), and if the total is above a threshold, the total may result in the detection of a corresponding attention level. For example, if the user glanced at an object multiple times within a select period of time (e.g., two seconds), and the combined amount of time from all of the glances is above the gaze threshold, then the user is determined to be gazing at the object. Similarly, if the combined amount of time from all the glances is above the stare threshold for the predetermined period, then the user is determined to be staring at the object. Similar aggregations of time may also be employed for glimpses and gazes, as well as different combinations of glimpses, glances, and gazes. For example, if the user first glances at an object and then gazes at the object and if the combined time from the glance and the gaze is above the stare threshold, then the user is determined to be staring at the object. But if the combined time is still below the stare threshold, then the user is determined to be gazing at the object.

Although the foregoing describes the user's attention in terms of an amount of time the user is looking at an object, additional factors may also be employed to determine the attention level of the user, either in lieu of or addition to the amount of time. In some embodiments, different numbers and combinations of looks may indicate a higher amount of user attention towards the object. For example, if the user glances at an object, as defined by an amount of time more than the glance threshold and less than the gaze threshold, and then performs a second glance, the two glances, regardless of a total amount of viewing time, may indicate that the user has a higher level of interest in the object and may be collectively defined as a gaze. Likewise, a glimpse followed by two glances may be the equivalent of a stare. Thus, different numbers of combinations of glimpses, glances, and gazes can result in an increased attention level for a user looking at an object. In various embodiments, a database of the different combinations of looks, viewing times, and the resulting attention levels may be stored.

Additional embodiments may include the analysis of gestures by the user to determine the attention level of the user or the direction of the user's view. For example, if a user points towards an object, then the attention level of that user may be higher than the attention level attributable to the time that user looked at the object. The system may also determine the user's viewing direction solely through the pointing gesture, or it may use this information to confirm or supplement its initial finding of the user's focus. As another example, if a first user looks at an object and begins to talk to a second user (which may be determined via facial recognition techniques that analyze the face for mouth movements or through voice capture and analysis), and the second user subsequently looks at the object, then the attention level of the first user may be higher than the attention level attributable to only the time the first user looked at the object. Accordingly, the more the user focuses his or her attention on the object, through one or more detected acts, the higher the attention the user is giving to the object.

The examples above generally discuss determining the attention level of each user in the automobile. In some embodiments, however, an aggregated attention level may be determined for all users in the automobile. In at least one such example, the total time each user in the automobile looks at a same object is combined to determine if it exceeds the glance threshold, the gaze threshold, or the stare threshold. In another example, if a first user looks at an object and begins to talk to the other users and the other users do not respond and look at the object, then the aggregated attention level for that object may be relatively low (e.g., identified as a glance) for the users as a collective unit, even though the first user looked at the object for quite some time (e.g., above the stare threshold).

An object is defined as a physical thing within one or more images captured by one or more cameras of a vehicle. Objects may include persons, animals, manmade structures, and articles of nature. Some objects may be considered objects of interest, which are those objects that present information to a user or are related to information a user may find interesting. Examples of objects of interest include but are not limited to billboards, store signs, advertisements, posters, other types of content-presenting objects, or landmarks. Some objects may be considered hazardous objects, which are those objects that currently or could pose a threat to the safety of the automobile or its driver or passengers. Examples of hazardous objects include but are not limited to pedestrians, animals in or next to the road, stopped cars in the road, pot holes, or other objects that risk the safety of the automobile or its occupants. Informational signs that present information to a user regarding the roadway or driver instructions or requirements may also be objects. Examples of informational signs include but are not limited to speed-limit, street, detour, navigational, or stop signs or traffic lights or signals or other driving-related emblems.

FIG. 1 illustrates a context diagram of an automobile environment that utilizes multiple cameras (or other imaging devices) to monitor a user and help determine what the user is looking at to provide content to that user in accordance with embodiments described herein.

System 100 includes an automobile 102 that has a head unit 104, an interior camera 110, an exterior camera 112, and an output interface 116. In various embodiments, the automobile 102 also includes one or more accessories 108a-108c, and the output interface 116 provides content to a user of the automobile 102. In the illustrative examples described herein, the computing device of the automobile 102 is the head unit 104, although other types of computing devices may be employed. Moreover, although this description primarily refers to automobiles, similar embodiments may also be employed in aerial vehicles, water vessels, railroad vehicles, and other modes of transportation.

The head unit 104 is a computing device that provides content, interactive controls, user interfaces, or other information to users of the automobile 102. As an illustrative example, the head unit 104 may provide a navigation interface, audio and radio controls, environmental controls, automobile performance or maintenance information, or other types of content.

The interior camera 110 is a camera mounted on or embedded in the automobile 102 and is configured to capture images of an interior of the automobile 102, such as from a frontal perspective of the automobile 102 to capture the faces of users in the automobile 102. In this way, the interior camera 110 is positioned and oriented in a manner to capture images of the eyes and head of one or more users in the automobile 102 to determine the attention of the users and where they are looking. As previously mentioned, a user may be the driver of the automobile 102 or a non-driver passenger of the automobile 102. Accordingly, the interior camera 110 may be positioned to capture images of the driver, a particular passenger or seat, or a combination thereof. For example, FIG. 2B illustrates a use case example of an image captured from an interior camera 110. In one arrangement, the automobile 102 may be equipped with multiple interior cameras 110.

The exterior camera 112 is a camera mounted on or embedded in the automobile 102 and is configured to capture images of a scene or area that is outside the automobile. All or portions of the scene or area may be viewable to one or more users of the automobile 102, although some of them may not be seen by the users. In this way, the exterior camera 112 is positioned and oriented in a manner to capture what each user is or may or should be looking at. Like the interior cameras 110, the automobile may be equipped with multiple exterior cameras 112.

As an example, the exterior camera 112 may be configured to capture a scene in front of the automobile 102, including the road and any object that is positioned on or on the side of the road. As described herein and illustrated in FIG. 2A, such objects may include a billboard 210 (or other objects of interest), a deer 218 (or other hazardous objects), or a speed sign 217 (or other informational signs). These objects may be identified in the images captured by the exterior camera 112 by image-recognition and image-processing techniques.

The interior camera 110 captures corresponding images of the users of the automobile 102 to determine if one or more of the users is looking at an object identified in the images captured by the exterior camera 112. If the system determines that a user is or should be looking at an object, then the system provides content associated with the object to the user. Additional information on this process will be provided below.

One example of content that may be provided to the user in response to the user looking at a billboard (i.e., an object of interest) may be directions to or an advertisement regarding a restaurant mentioned on the billboard. In this way, the user does not need to write down or memorize the message or information on the billboard. Instead, the details of the billboard message are analyzed and provided to the driver via output interface 116, the head unit 104, or the user's mobile device 114, such as via a text message or email. Another example of content that may be provided to the user in response to the user not looking at the deer 218 may be an audible warning that an object is in the road. Yet another example of content that may be provided to the user in response to the user not looking at a speed sign may be a light or visual alert that there is change in the speed limit. If the user is looking at the hazardous object or the informational sign, then the system may not need to provide a warning or alert to the user. The warnings or alerts may be audible, visual, or tactile in nature or any combination of these three types.

In another arrangement, if the user fails to respond, any number of safety features of the automobile 102 may be activated. For example, a safety system (not shown) of the automobile 102 may automatically apply the brakes or commandeer the steering of the automobile 102 to prevent hitting an object.

Thus, embodiments described herein can be utilized to analyze images captured from the exterior camera 112 and the interior camera 110 to determine whether a user is looking at an object, including objects of interest, hazardous objects, or informational signs.

In various embodiments, the head unit 104 may be configured to communicate with other computing devices, such as mobile device 114 or a remote server 124. For example, the head unit 104 may receive content from the remote server 124 via communication network 122, which the head unit 104 can output via the output interface 116. Such content may be associated with objects that are identified as being looked at by the user, as described herein.

In various embodiments, an onboard computer, such as the head unit 104 or some other computer, performs the processing of images captured via the interior camera 110 and the exterior camera 112. In at least one embodiment, the image processing may be performed by another computing device on the automobile 102 or by a remote computing device that is separate from the automobile 102, such as mobile device 114 or remote server 124. Likewise, in some embodiments, an onboard computer, such as the head unit 104, performs the content selection described herein. In other embodiments, the mobile device 114, the remote server 124, or some other computing device may perform the content selection. Accordingly, the functionality described herein with respect to image processing and content selection may be performed by the head unit 104, the remote server 124, the mobile device 114, or some other computing device or some combination thereof.

For example, an onboard computer, such as the head unit 104, may analyze the images and determine what object the user is looking at and send to the remote server 124 a request for content related to that object. In response, the remote server 124 may return content to the head unit 104. The head unit 104 can then output the content via the output interface 116, as described herein. To maximize the efficiency of the processing of digital images, the onboard computer (such as the head unit 104) can include one or more graphic processing units ("GPU").

As another example, an onboard computer, such as the head unit 104, may send the images to the mobile device 114 or the remote server 124 along with the request for content. In response, the mobile device 114 or the remote server 124 may analyze the images and select content based on the object being looked at by the user. The mobile device 114 or the remote server 124 may then send the selected content to the head unit 104 for output via output interface 116. Other devices or systems, whether part of or remote to the automobile 102, may be configured to process the images, identify objects in the images, and retrieve or generate content related to the identified objects.

In one arrangement, whichever device or system responsible for this activity may be programmed with one or more machine-learning ("ML") models (which may include deep-learning models) to assist in the identification of the objects. For example, the head unit 104 or another onboard computer of the automobile 102 communicatively coupled with the head unit 104 may be loaded with one or more of these ML models. In addition, the remote server 124 or some other system that is part of a cloud-based solution may be loaded with one or more ML models, which can also process the images from the automobile 102 and other vehicles. Improvements in the ML models of the remote server 124 (or other system) may be fed to any ML models on the head unit 104 or onboard computer of the automobile 102 to enable these local models to receive the benefit of such remote processing. These enhancements of the ML models may also be provided to locally stored ML models on other vehicles.

The output interface 116 is an interface that is configured to output content to a user of the automobile 102. The output interface 116 may include a visual interface, such as a display device, an audio output interface, such as a speaker, or a haptic interface, such as a tactile output device or a combination thereof. Therefore, the output interface 116 is configured to output visual, audio, or tactile content or some combination thereof. In some embodiments, the output interface 116 or a portion of it may be separate from or part of the head unit 104. For example, the head unit 104 may include a built-in display device as one component of the output interface 116 and a separate speaker external to the head unit 104 as another component of the output interface 116.

In at least one embodiment, the mobile device 114 acts as an intermediate device between the head unit 104 and the remote server 124. In this way, the mobile device 114 may forward the images or content request from the head unit 104 to the remote server 124 (or other system) for processing or forward the selected content from the remote server 124 to the head unit 104. In some other embodiments, the mobile device 114 may display the selected content to the user on a display device of the mobile device 114 or project it to the head unit 104 for presentation through the head unit 104. As another option, the head unit 104 may include a data communications module ("DCM") for exchanging long-range communications. In this case, the remote server 124 (or other system) may send relevant content to the head unit 104 without the assistance of an intermediate device, like the mobile device 114.

In some embodiments, the remote server 124, the head unit 104, and the mobile device 114 communicate with each other via a communication network 122. The communication network 122 is configured to couple various computing devices to transmit data from one or more devices to one or more other devices. Communication network 122 includes various wireless networks that may be employed using various forms of communication technologies and topologies, such as cellular networks, mesh networks, or the like. The mobile device communication network 120, the communication network 122, and the accessory communication network 106 may be separate communication networks, as illustrated, or some of them may be part of the same communication network or share network components.

In various embodiments, the head unit 104 communicates with the mobile device 114 via a mobile device communication network 120. The mobile device communication network 120 is configured to couple the mobile device 114 with the head unit 104 to transmit content/data between the mobile device 114 and the head unit 104. The information communicated between devices may include current accessory status or data, requests to access accessory data, requests to control or modify an accessory, video data, voice data, image data, text data, or other types of content, data, or information. The communication network 120 may include a variety of short-range wireless communication networks, such as personal-area networks utilizing classic Bluetooth or Bluetooth Low Energy protocols, or an IR optical network to enable communication between the mobile device 114 and the head unit 104.

The remote server 124 is any combination of computing devices, such as one or more servers or other cloud resources, which is remote to the automobile 102 and can provide content or other information to the head unit 104 or the mobile device 114. Although the remote server 124 is illustrated as a single device, embodiments are not so limited. Rather, the remote server 124 may be one or more computer devices that perform one or more functions.

The mobile device 114 includes any device capable of communicating with a head unit 104 of the automobile 102 or remote server 124. The mobile device 114 is configured and structured to send and receive information, content, or controls to and from the head unit 104 or the remote server 124. Examples of the mobile device 114 include laptop computers, smart phones, tablet computers, wearable computing devices, other smart devices, or other handheld computing devices.

In some embodiments, the head unit 104 may be configured to access or receive information or control use of the one or more accessories 108a-108c. The accessories 108a-108c can include any automobile utility or device that is controllable by a user. Examples of these accessories include adjustable seats, sun roof, side mirrors, rear-view mirror, air conditioner, power windows, or other controllable features of the automobile 102. Accessories 108a-108c may also include virtually any automobile utility or device that provides information or data to the user. Examples of these accessories include, but are not limited to, speedometer, odometer, oil pressure gauge, temperature gauge, or other automobile sensors that provides information to a user of the automobile. Accessories 108a-108c may further include applications executing on the head unit 104 that have two-way interaction with the user. Examples of these accessories include, but are not limited to, navigation, audio and radio controls, television or music applications, environmental control applications, automobile performance or maintenance applications, or other applications. It should be noted that some accessories may only output data, some accessories may only receive controls to manipulate the accessory, and some accessories may input and output data. For example, a speedometer may only output the current speed of the automobile; a power window may only receive controls to move the window up or down, but not return any information to the head unit; and the navigation system may receive controls for a destination and also return a suggested travel route to the destination. It should be further noted that these examples are non-exhaustive and other types of accessories may also be employed.

The head unit 104 can communicate with the accessories 108a-108c via an accessory communication network 106. The accessory communication network 106 is configured to couple the accessories 108a-108c with the head unit 104 to transmit content/data between the accessories 108a-108c and the head unit 104. The information communicated between devices may include current accessory status or data, accessory control data, video data, voice data, image data, text data, or other types of content, data, or information. The accessory communication network 106 may include one or more physical networks; one or more wireless communication networks; one or more application program interfaces; or one or more other networks capable of transmitting data from one accessory to another, from an accessory to the head unit 104, or from the head unit to an accessory; or some combination thereof depending on the types of accessories communicating with the head unit 104. For example, the accessory communication network 106 may include an automotive body communication network, such as a wired controller area network, short-range wireless communication network, such as personal-area networks utilizing Bluetooth Low Energy protocols, or any other type of network.

In some embodiments, the accessory data may assist in determining whether a user is distracted or is unaware of the presence of an object, such as a hazardous object. For example, the exterior camera 112 may often capture images of other automobiles on the road. If another automobile is traveling in the same direction and speed as the automobile 102, then it may not pose a threat to the automobile 102 and may not be identified as a hazardous object. But if another automobile suddenly brakes in front of the automobile 102, then that automobile may become a hazardous object to the automobile 102. And if the driver is not looking at the braking automobile or is not subsequently braking itself, then a warning may be provided to the user. In these examples, the speedometer and the braking status of the automobile 102 (which are included in accessories 108a-108c) are utilized to determine if the driver of the automobile 102 has responded to the braking automobile. This accessory data, alone or in combination with the image analysis of the user, can be used to further improve the accuracy of the system, including by forming part of the data analyzed by the ML models.

In some other embodiments, the head unit 104 may communicate with the mobile device 114 via mobile device communication network 120 and act as an intermediate device that facilitates communication between the mobile device 114 and the accessories 108a-108c. The head unit 104 can act as a gateway between the mobile device 114 and the accessories 108a-108c to provide authentication and authorization for permitting or restricting the control of accessories 108a-108c and the transfer of accessory data. In this way, a user can access information from or control accessories 108a-108c via mobile device 114.

Figure 2A:
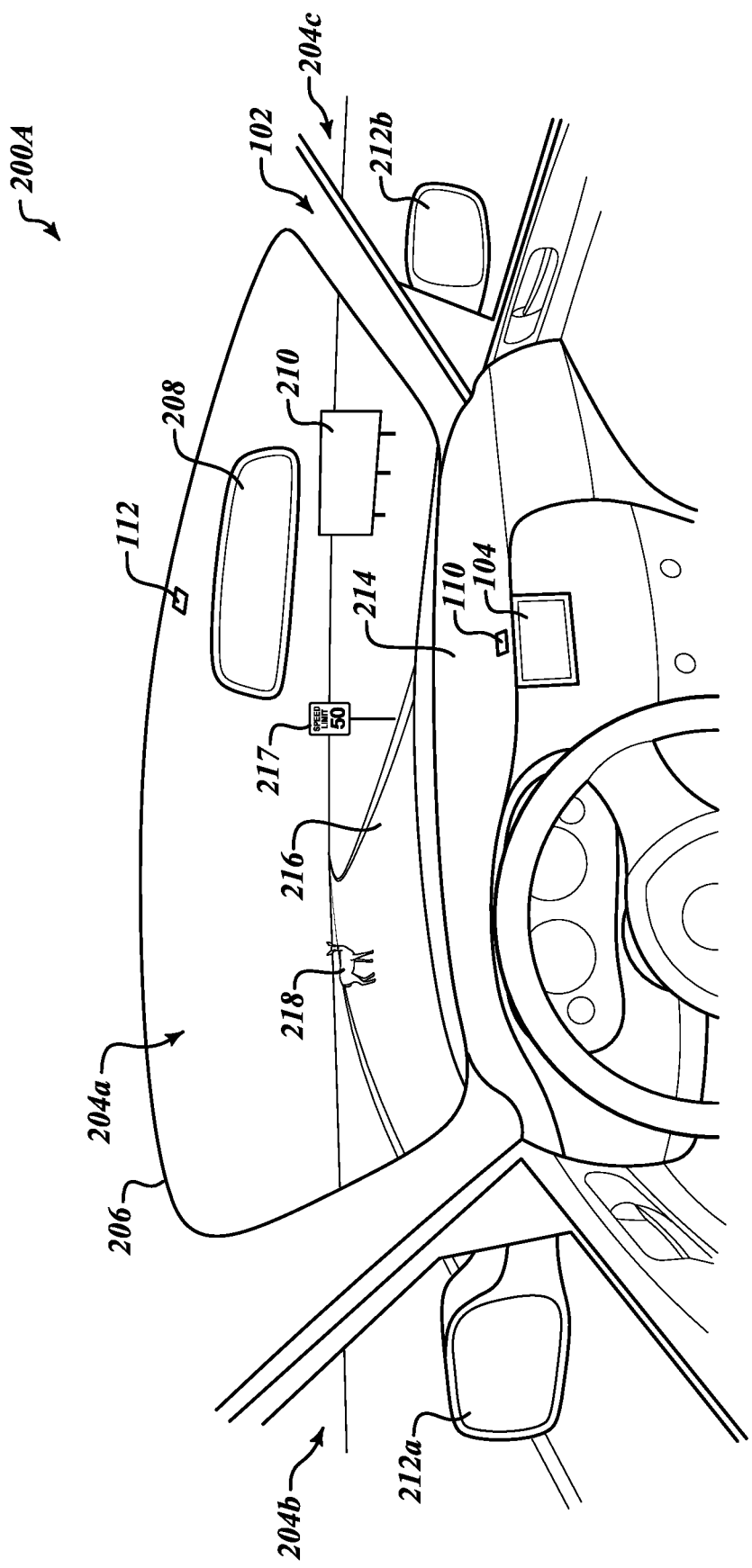
FIGS. 2A-2C show use case examples of various views of an interior and exterior of an automobile in accordance with embodiments described here.
Figure 2B:
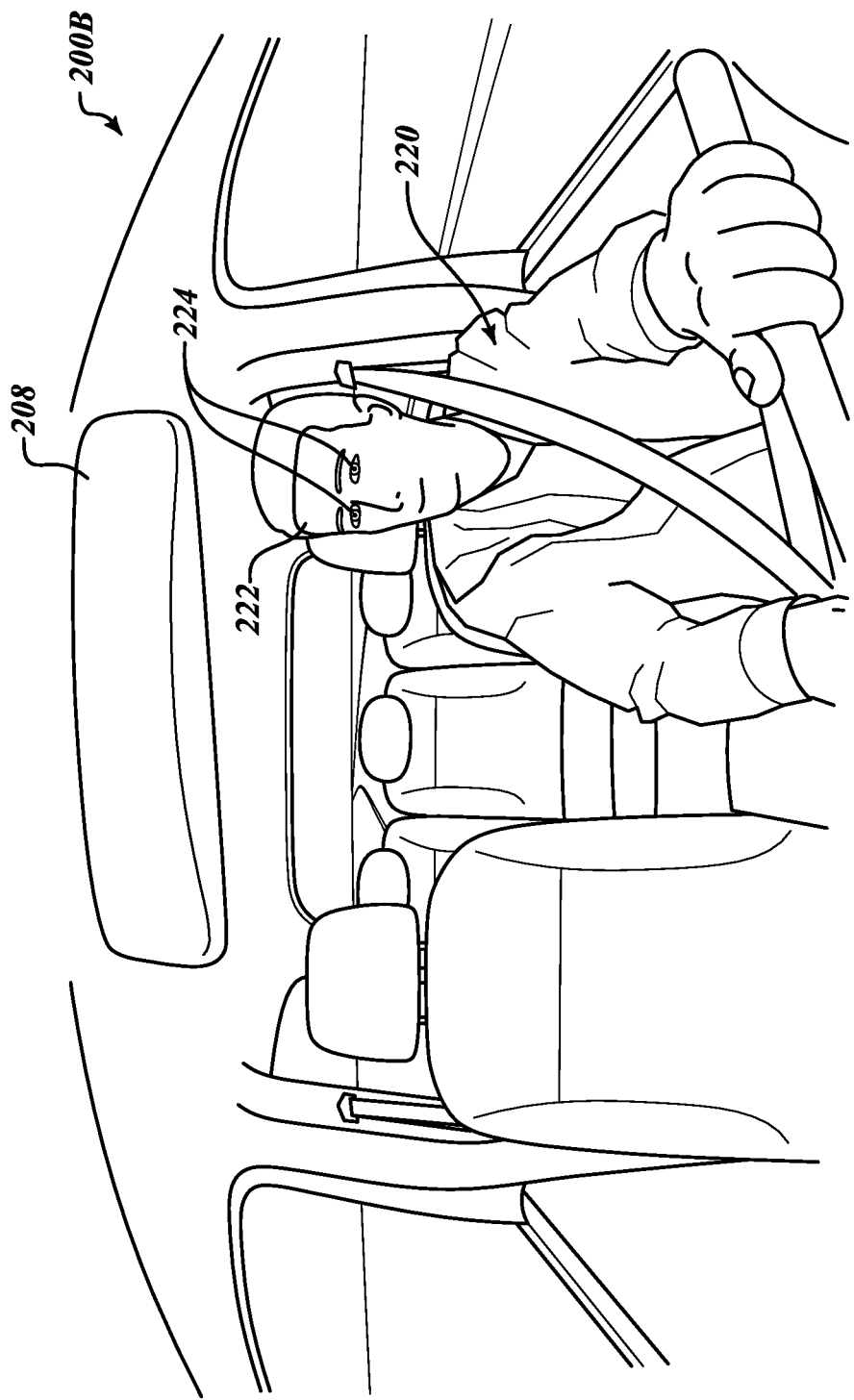
Figure 2C:
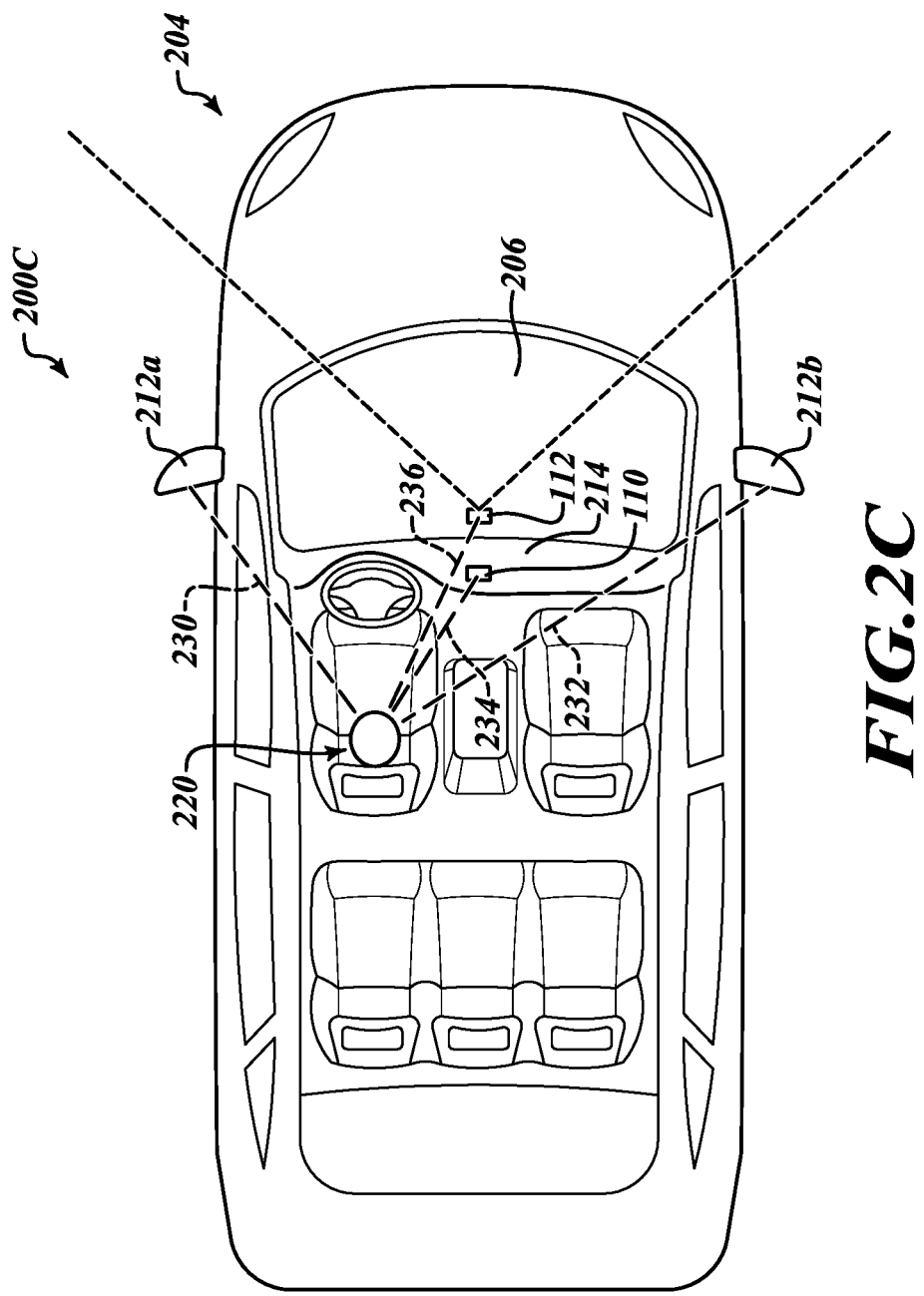

FIGS. 2A-2C show use case examples of various views of an interior and exterior of an automobile in accordance with embodiments described herein. FIG. 2A shows an example 200A from an interior of an automobile 102 looking at a scene 204 substantially in front of the automobile 102, such as from a perspective of a driver of the automobile 102. The automobile 102 includes a front windshield 206, a rearview mirror 208, side mirrors 212a and 212b, a dashboard 214, a head unit 104, an interior camera 110, and an exterior camera 112.

In this example, the interior camera 110 is positioned on the automobile 102 to capture images of the passenger cabin of the automobile 102. As such, users in the automobile 102 typically form part of these images. Also, in this example, the exterior camera 112 is positioned on the automobile 102 to capture images of the outside environment. Here, the outside environment may include a scene 204 that is at least partially viewable to a user of the automobile 102, although other areas beyond the visual reach of the user can be the subject of the images. In one arrangement, the interior camera 110 is built into the dashboard 214 of the automobile 102, and the exterior camera 112 is mounted to the front windshield 206. Embodiments are not limited to these positions of the interior camera 110 and the exterior camera 112. Rather, the interior camera 110 and the exterior camera 112 can be positioned or mounted on or built into other aspects of the automobile 102. For example, the interior camera 110 may be built into the rearview mirror 208 or the head unit 104, and the exterior camera 112 may be built into the rearview mirror 208 or a front bumper (not illustrated) of the automobile 102.

Although not illustrated, in some embodiments, the automobile 102 may include multiple interior cameras to capture images of the user from different angles or those containing other users. Similarly, in some embodiments, the automobile 102 may include multiple exterior cameras to capture images of different areas outside the automobile. Functionality described herein for calibrating and processing images from one interior camera and one exterior camera can likewise be performed for multiple interior or exterior cameras.

In the illustrated example, the scene 204 captured by the exterior camera 112 includes three viewable areas: scene 204a-204c, where 204a is an area viewable through the front windshield 206, and the scenes 204b and 204c are areas viewable through side windows adjacent to side mirrors 212a and 212b, respectively. Although the exterior camera 112 is positioned and configured to capture the scene 204 substantially in front of the automobile 102, the exterior camera 112 may be positioned and configured to capture an area viewable by the user to the left or right of or above, underneath, or behind the automobile 102.

As the automobile 102 is being operated, the interior camera 110 is capturing images of the users in the automobile 102, while the exterior camera 112 is capturing corresponding images of the scene 204. The operation of the interior camera 110 and the exterior camera 112 may be synchronous, meaning the cameras operate at the same frame rate and the images produced by the cameras are temporally matched or aligned. Through this step, the accuracy of comparative analyses of the pictures generated by the interior camera 110 with respect to those from the exterior camera 112 can be increased. As an option, the images produced by both the interior camera 110 and the exterior camera 112 may be time stamped or chronologically arranged to maintain their synchronicity during or for downstream processing.

In one embodiment, the frame rate of the interior camera 110 and the exterior camera 112 can be set to a standard speed, such as thirty frames per second. Alternatively, the frame rate of the cameras may be adjustable. The frame rate may be changed in view of certain conditions or events. For example, the frame rate may be adjusted based on the speed of the automobile 102, such as lowering the rate if it is being driven at a slow speed. If the automobile 102 speeds up, the frame rate could be increased correspondingly. As another example, the frame rate may be adjusted in view of the amount of traffic near the automobile 102 or the density of the setting in which it is operating. Specifically, if the automobile 102 is being driven in a remote, lightly traveled area, the frame rate may be reduced because the chances of encountering an object should drop. In contrast, the frame rate may be raised in urban settings. Reducing the frame rate may lower the number of images to be analyzed for identifying objects.

In one arrangement, the interior camera 110 and the exterior camera 112 may both be configured to operate in the visible spectrum, the portion of the electromagnetic spectrum that is visible to the human eye. In addition, one or both cameras may be configured to operate in the non-visible spectrum, the remaining ranges of the electromagnetic spectrum that are invisible to humans. This feature may enable either camera to operate at night or in low-light conditions. The cameras may also be red-green-blue ("RGB") cameras and if desired, can be equipped with one or more bandpass filters to allow light from other spectral bands, such as near infra-red, to reach their image-sensor circuits.

Because the interior camera 110 and the exterior camera 112 may generate significant amounts of data, one or more features may be implemented to control it. For example, some of the objects in the images may be filtered out prior to the images being analyzed, a process that can reduce background clutter and reduce the amount of data to be transmitted and processed. This pre-processing step can occur without the need to identify the object. As a specific example, a current frame generated by a camera can be set as a reference frame, and the frame previously produced can be subtracted from the reference frame to remove data associated with insignificant objects. An insignificant object is an object that is background clutter and does not present a danger, concern, or interest to the user or the automobile 102.

Consider the following example. The interior of the automobile 102 may contain several insignificant objects. These objects are generally stationary with respect to the interior, and examples include seats, dashboards, steering wheels, gear shifters, and other fixed structures in the passenger cabin. Stripping out data related to such objects from the images cuts down on the amount of time required to analyze them but does not harm the overall effectiveness of the process because the objects do not contribute to determining the user's line of sight. In some cases, the same principle can be applied to the exterior camera 112. For example, some exterior objects may be within the field-of-view of the camera 112 but are insignificant objects because they are part of the automobile 102, like the hood (or engine cover), side mirrors 212a and 212b, or bumpers.

As noted earlier, the automobile 102 may include multiple interior cameras 110 and external cameras 112. If the images generated by one or more of the interior cameras 110 or exterior cameras 112 reveal only insignificant objects, such as over a period of time, these interior cameras 110 or exterior cameras 112 can be turned off (or their frames rates may be substantially throttled) or their images can be dumped before any processing (or pre-processing) of them will occur. As an example, this procedure may be applied to an interior camera 110 focused on an empty passenger seat of the automobile 102 or an exterior camera 112 when the automobile 102 is stopped or placed in the parking gear. Deactivating the cameras or discarding the images may be cyclic to determine if objects that are not insignificant (like a user) may have appeared. If they have, the deactivation or image dumping may cease; otherwise, the affected cameras may return to these states until the next cycle. Similar to the examples presented above, this technique can also reduce the level of data to be analyzed.

Additionally, selectively adjusting the resolution of the interior camera 110 or the exterior camera 112 based on certain conditions or events may increase the efficiency of the overall process of analyzing the images. For example, like the frame rate, if the speed of the automobile 102 or the characteristics of the setting in which it is operating change, the resolution of the interior camera 110 or the exterior camera 112 may be correspondingly modified. In particular, the resolution of a camera may be reduced at lower speeds or in rural settings and increased at higher speeds or in densely populated locations. Further, the resolution may be reduced if the camera is capturing images containing only insignificant objects, like an empty passenger seat.

The images from the exterior camera 112 are analyzed for objects, including objects of interest to the user, such as the billboard 210 on the side of road 216, hazardous objects, such as the deer 218 standing in the road 216, or an informational sign, such as speed-limit sign 217. The images from the interior camera 110 are analyzed to determine if the user is looking at any of these objects. An example of an interior image captured from the interior camera 110 is shown in FIG. 2B. The head unit 104, onboard computer, remote server 124, or another system or any combination of them may be responsible for analyzing the images.

As discussed in more detail below, the user's attention position may be used to determine the attention direction of the user, as captured by the interior camera 110. Once determined, the attention direction may be compared with the scene 204 captured by the exterior camera 112. As part of this process, the user's attention may be classified into one of the attention levels previously described, which may indicate that the user's attention direction is focused on an object in the scene 204.

As an example, the comparison may show the user is looking at the billboard 210. In response, the head unit 104 (or some other component) may display content associated with the billboard 210, such as an advertisement, directions, coupons, hours of operation, etc. The head unit 104 may generate this content on its own or can send a request to the server 124 (or some other system) for it. In some other embodiments, the images captured by the interior camera 110 and the exterior camera 112 can be analyzed to determine if the user is paying attention or looking at a direction that may cause them to miss a hazard to the automobile 102. For example, if the user is looking at the billboard 210 but a deer 218 is standing in the road 216, then the head unit 104 may present an alert to the user regarding the deer 218, such as an audio tone, steering wheel vibration, or visual light on the dashboard 214. The automobile 102 may take further action, such as automatically applying its brakes or steering the automobile 102 away from the deer 218. Likewise, the images captured by the interior camera 110 and the exterior camera 112 can be analyzed to determine if the user is paying attention or looking along a direction that may cause them to miss an informational sign. For example, if the user is looking at the billboard 210 but does not look at the speed-limit sign 217, then the head unit 104 may present an alert to the user regarding the speed-limit sign 217, such as audible speech or visual display of the speed on the speed-limit sign 217.

FIG. 2B shows an example 200B of an image captured of a user 220 of the interior of the automobile 102 looking at a scene 204 substantially in front of the automobile 102. As described herein, the positions of the head 222 and eyes 224 of the user 220 are analyzed in the image to determine if the user is looking at the rearview mirror 208, billboard 210, deer 218, or speed-limit sign 217 illustrated in FIG. 2A. Various techniques may be employed as part of the analysis to determine the attention position of the user 220, as will be explained below.

FIG. 2C shows an example 200C of a top-down view of the automobile 102 shown in FIGS. 2A and 2B. FIG. 2C will be described in combination with FIGS. 2A and 2B. As discussed above, the exterior camera 112 captures the scene 204 that includes an area that may be visible to the user 220, and the interior camera 112 captures images of the user 220 to determine where the user 220 is looking. One or more techniques may be employed as part of the analysis to determine the attention position of the user 220. Some of these techniques can include processes for determining the position of the head 222 and tracking the eyes 224 of the user 220.

For example, images from the interior camera 110 may contain data associated with the pupils of the eyes 224 and reflections of light from their corneas, which can be used to determine vectors between the center of the pupil and the reflections from the cornea. These vectors can then be used to compute the line of sight of the user 220. To assist in the process, the interior camera 110 or some other light source may project invisible light towards the eyes 224 of the user 220. Other techniques for tracking the eyes 224 may be employed.

In addition, the position or pose of the head 222 of the user 220 can be estimated based on the data in the images from the interior camera 110. For example, a partial body detection representing the head 222 of the user 220 may be generated from the data, such as through the identification of pixels associated with human skin or morphological estimations (or both). Once the head 222 is detected, various methods can be used to determine its orientation, such as by geometric methods, which identify facial landmarks and rely on the geometrical symmetry of human faces. This process may also extend to other body parts, including the neck or torso. Confidence factors may also be assigned to any of these positional determinations as an indication of their accuracy. Moreover, many other techniques for detecting the head 222 and estimating its orientation may apply here.

In one arrangement, the information produced from determining the positioning of the eyes 224 and the pose of the head 222 may be merged, which may generate a more accurate estimate of the attention position of the user 220. Both techniques, however, are not necessary for this estimate, as only one or the other may be used to determine it. From the attention position, the user's attention direction can be estimated, based on a specific point or area. For example, the system can estimate the direction of the user's line of sight or area of focus, and this estimate can be correlated with image data relating to the external environment to possibly identify objects of interest to the user or of which the user is unaware. Many types of data relating to the user's attention position may be considered for computing the attention direction; however, as an option, some of this data may be given more (or less) weight as part of determining the attention direction. As an example, a heavier weight may be applied to the positioning of the eyes 224 in comparison to that for the orientation of another body part, like the user's torso. As another example, the confidence factors attached to the estimates forming the user's attention position may influence the analysis of the attention direction, such as placing less emphasis on an element with a lower confidence factor.

In some embodiments, a reference system that can include one or more reference points or angles may be established to assist in determining the position of the head 222 and eyes 224. For example, during calibration, a vertex may be established at the center of the face of the user 220 and various rays may be defined to set reference angles, which can be used as the base for determining the positions associated with the user 220. In some cases, a ray 230 and a ray 232 can be defined respectively for the side mirror 212a and side mirror 212b. As another example, a ray 234 and a ray 236 can be set respectively for the interior camera 110 and the exterior camera 112. Because the geometry of the automobile 102 is known, many other reference points or angles may be used for this purpose.

A reference system may also be defined for the exterior of the automobile 102 to determine the positioning of the objects. Specifically, any number of reference points or angles may be set for the frontal exterior of the automobile 102. As an example, a vertex can be set at the exterior camera 112 or some other component of the automobile 102, and an angle based on the exterior camera 112 can be defined. This angle may be a reflex angle whose measurement can be based on the likelihood that the user 220 may be able to see objects from the vantage point of, for example, the driver's seat. This measurement may also take into account the ability of the user 220 turning his or her head 222 to the left or right when seated in this seat. Of course, other vantage points may be considered. (This solution may also be repeated for other portions of the exterior of the automobile 102.) Once this reference system is established, it can be mapped to the reference system created for determining the positioning of the head 222, eyes 224, or other parts of the user 220, and the results can be part of a table or database for future retrieval. Accordingly, when comparing the image data from the interior camera 110 and the exterior camera 112, this mapping can be used to correlate the attention direction of the user 220 with an identified object of the scene 204.

The examples described above primarily focus on a user seated in the driver's seat of the automobile 102. Notably, however, a reference system may be established for other sections of the automobile 102, including for one or more passenger seats. For example, a user may be seated in the front passenger seat, and a reference system can be defined for this seat to ensure accurate estimations of head and eye orientations. New reference systems with respect to the exterior of the automobile 102 may be created or adjustments made to existing systems, if necessary.

In an alternative arrangement, a single reference system may be generated for determining each of the attention position and attention direction of the user and the relative locations of the objects that are part of the exterior. The reference points or angles that may form this system can be associated with one or more things previously mentioned, like the interior camera 110, exterior camera 112, side mirrors 212a and 212b, or a user.

As shown above, a technique that relies on morphological detection and analysis may be useful for analyzing the images generated by the interior camera 110 because the objects in the interior of the automobile 102 worthy of analysis may be limited to humans. In contrast, given the inherent unpredictability of the number and type of objects in the scene 204, more comprehensive solutions may be required. In one embodiment, the head unit 104 or onboard computer may be programmed with object-recognition algorithms to identify one or more objects that are exterior to the automobile 102. Examples of these algorithms include one or more ML models, including deep-learning models.

Once the objects in the image are identified, they can be labeled and confidence factors, indicating the probability of the accuracy of the identification, may be assigned to them. Objects tagged with confidence factors below a certain threshold may be discarded, at least for that particular image. In other cases, objects with confidence factors below the threshold or that are otherwise unidentifiable may still be considered as part of the correlation with the user's attention direction. For example, the system may be unable to accurately identify an object located in the middle of the road, which may present a hazardous condition. As such, the system may avoid discarding the unidentified object to ensure the user is cognizant of it. (An object may be labeled as an unidentified object if its confidence factor is below the threshold.) Using the relevant reference system, a relative position of one or more of the objects (identified or unidentified) may be estimated.

As noted earlier, object recognition can also be performed by a system that is remote to the automobile 102, like the remote server 124. Over time, the accuracy of these models may improve, and updates to them may be received from the remote system. Further, the objects identified in the images may be labeled locally, such as by the head unit 104 or another onboard computer, and this data may be provided to one or more cloud-based ML models (including deep-learning models) to help train them. Other vehicles that are similarly configured may perform the same step, ensuring large amounts of data for the models.

As part of the process of identifying objects, the object-recognition models may determine a context of an object or some other feature that distinguishes the object from other similar objects. For example, the models may determine an object is a billboard and further identify an entity that is associated with an advertisement presented by the billboard. The entity may be a retailer, restaurant chain, or other commercial establishment. To assist in this step, the models may be configured to recognize various characters or symbols and match them to establishments associated with them. Examples of these characters or symbols include the letters of a brand name or a trademark symbol. Recognition at this granularity can enable the onboard computer to generate or request content related to a specific business or organization. This data may be garnered from other sources, like advertisements or other business-related information on the surfaces of buildings or other vehicles or other commercial signage.

As is known in the art, some automobiles 102 are equipped with automated-driving systems. These systems can range from those that may simply issue warnings and momentarily intervene in the operation of the car to others that require no human control at all. Automated-driving systems typically rely on various technologies to analyze sensory data to detect the road surface and other things that are related to controlling the vehicle, like pedestrians, stop signs, and other cars. Although this detection is limited to objects directly in the car's path or related to traffic control, the system presented here may reduce its computational requirements by accessing this data. For example, the current arrangement may rely on the automated-driving system to detect the road ahead, traffic control signs or signals, and objects in or near the road and can supplement this detection by specifically identifying such objects, if necessary, and determining their relative positions for further analysis.

In one arrangement, the step of comparing the images can include mapping the data relating to the attention direction of the user from an image captured at time $T_1$ by the interior camera 110 against the data relating to the identified objects from an image also captured at time $T_1$ by the exterior camera 112. Using images generated at the same time can increase the accuracy of the results produced by the GPU, although such synchronicity is not mandatory, as some temporal offset may be acceptable. The images from the interior camera 110 and the exterior camera 112 being compared to one another may be referred to as corresponding images. This procedure can also include referring to the table or database containing the results of correlating the interior and exterior reference systems (or a single reference system), as described above.

As an example, the GPU can generate matching scores for the objects for the corresponding $T_1$ images. A matching score can serve as an indication of the probability that the user's attention direction is aligned with an object. In one embodiment, the object with the highest matching score can be selected as the focus of the user for the corresponding $T_1$ images. As another option, two or more objects with the highest matching scores may be identified as the targets (or potential targets) of the user's attention for the corresponding $T_1$ images. Objects that have been determined to be the focal point of the user's attention may be referred to as objects of interest.

In another example, a threshold can be set for the matching scores, and if the matching scores generated for the objects related to the corresponding $T_1$ images is below this threshold, none of the objects may be selected as the focal point of the user. Such an event may indicate the user was simply looking at the road ahead, with no objects present in that area or at least not the subject of the user's attention.

This procedure may be repeated over a certain amount of time or some number of corresponding images. For example, the GPU can produce matching scores for several sets of corresponding images from the interior camera 110 and the exterior camera 112 and generate an average matching score for all (or at least some) of the objects detected across this interval. (This interval may be based on time or some number of sets of corresponding images.) These objects may include those that are present in only some of the images from the exterior camera 112 for this interval, such as if an object passes out of view of the camera 112 for the latter half of the interval.

In this manner, the classifications previously described may be applicable. For example, the interval can be set to substantially (or exactly) match the maximum attention-level threshold, the stare threshold. This configuration can enable the GPU to identify the existence of any of the attention levels—glimpse, glance, gaze, and stare—and apply them as part of determining the average matching scores. For instance, the average matching score for an object that is the focus of one or more gazes over the interval may be increased to reflect this heightened interest on the user's part.

As noted above, the automobile 102 may retrieve content related to one or more objects of interest. In particular, content associated with one or more identified objects with the highest matching scores or average matching scores may be presented to the user. As an example, the analysis may determine that a user is focused on a billboard advertisement for a restaurant and the brand name or trademark of the advertised business may be recognized. In response, the head unit 104 may present an option for selecting a menu of the restaurant, contact information for it, or a selection for launching a navigation route to it.

As another example, if the system is unsure of which object of multiple objects is drawing the interest of the user, such as if the objects have identical or nearly identical average matching scores, the head unit 104 may retrieve content related to both and present an option for the user to select the content related to one or more of them. In another embodiment, content related to one or more identified objects can be presented to the user irrespective of their average matching scores.

As also noted earlier, some objects may be considered hazardous objects because they may present some danger (including potential danger) to the user or the automobile 102, such as an object near or in the road ahead of the automobile 102. These detected objects may be identified or unidentified objects. In one embodiment, the system can determine the probability of an impact or other danger, based on factors like velocity, proximity of the object to the automobile 102, lighting or weather conditions, and driving ability of the driver. (At least some of this data may be provided by one or more of the accessories 108a, 108b, 108c of the automobile 102.) If the object is identified, particularly with a high degree of confidence, this information may also be considered when determining such probability. For example, the probability of an impact if the object in question is identified as a child or elderly pedestrian will be increased in comparison to that for an adult pedestrian, given the likelihood that the adult may react quicker to the potential danger than the child or senior citizen.

The average matching scores for hazardous objects may be considered as part of determining the impact or danger probability. For example, if an average matching score reveals that the user is unaware of the hazardous object, content in the form of a warning may be presented to the user. Examples of these warnings are described above and below. In this scenario, a lower average matching score may be more important in determining whether to present content to the user. If the system determines that the user appears to be aware of the hazardous object, no warning may be generated. Nevertheless, other factors (like excessive speed or rainy weather) may outweigh the increased average matching score attached to the hazardous object, leading to the warning being issued.

Informational signs may also lead to content being presented, particularly if the average matching scores associated with them are low. For example, the system may identify a stop sign and determine the user is incognizant of it. This object may not necessarily increase the likelihood of an impact, but it may escalate a probability of danger. Here, a warning may be presented to inform the user of the approaching stop sign. If informational signs are identified, the warnings may incorporate the information associated with them, such as announcing or displaying the speed limit posted on a speed-limit sign. These warnings may also be issued even if the user is aware of the informational signs, given other circumstances (like elevated speed or weather conditions) that may warrant such an event.

The operation of certain aspects of the disclosure will now be described with respect to FIGS. 3 and 4. In at least one of various embodiments, processes 300 and 400 described in conjunction with FIGS. 3 and 4, respectively, may be implemented by or executed on one or more computing devices, such as head unit 104, mobile device 114, remote server 124, or other onboard or cloud-based systems.

Figure 3:
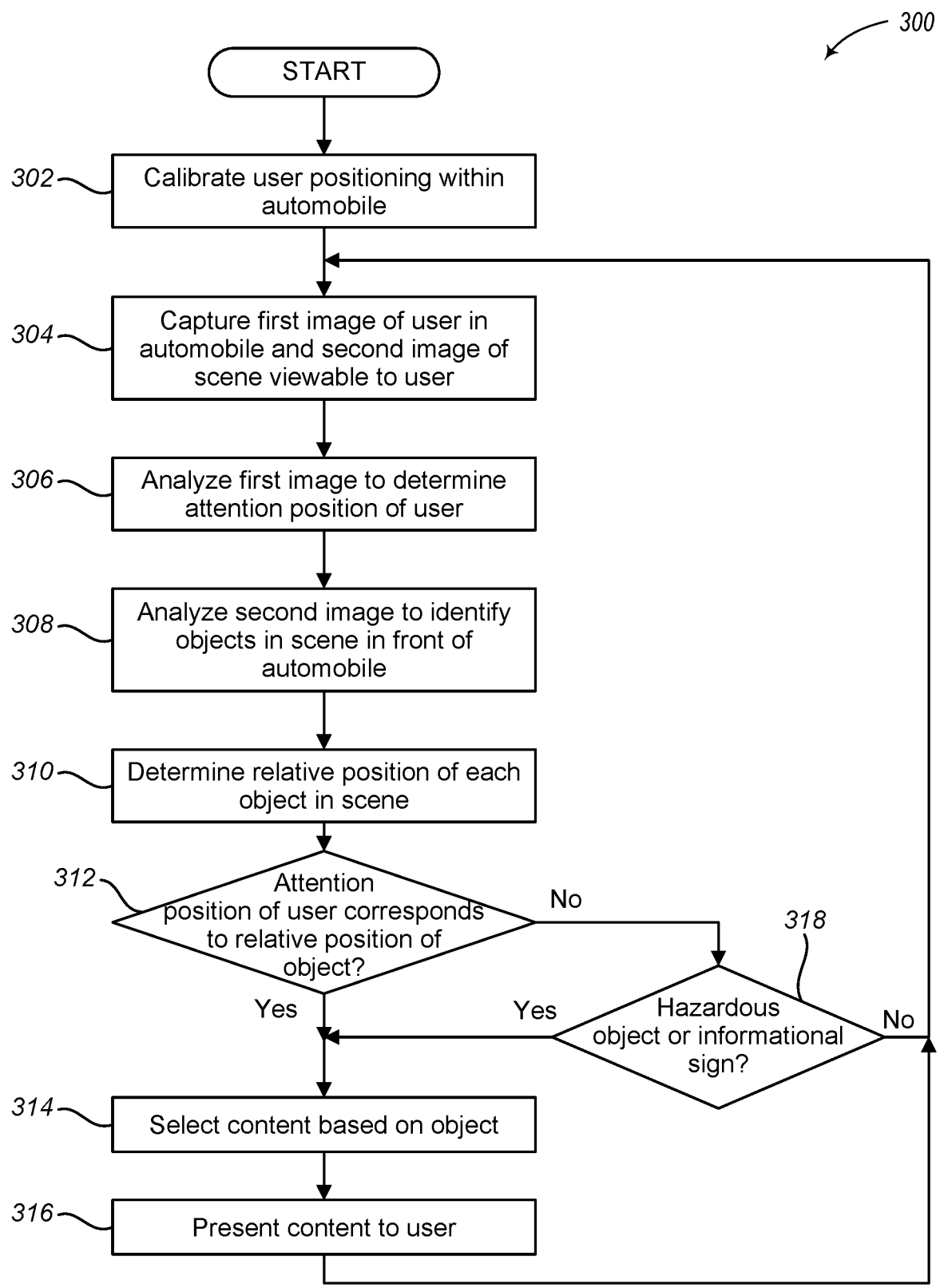
FIG. 3 illustrates a logical flow diagram generally showing one embodiment of an overview process for monitoring an automobile user and a scene in front of the automobile to select and provide content to the user in accordance with embodiments described herein.

FIG. 3 illustrates a logical flow diagram generally showing one embodiment of an overview process for monitoring an automobile user and a scene in front of the automobile to select and provide content to the user in accordance with embodiments described herein. This process is not necessarily limited to the chronological order shown here and may be executed without adhering to all the steps described here or with steps that are beyond those in this diagram. To be clear, process 300 is merely an example of a flow that may be applicable to or adopt the principles described above.

Process 300 begins, after a start block, at block 302, where a position of the user within the automobile is calibrated with respect to the interior of the automobile. One example process of such calibration is described in more detail below with respect to FIG. 4.

Process 300 proceeds to block 304, where a first image and second image are captured. The first image is captured by an interior-facing camera, such as the interior camera 110 of FIG. 1 and is of a user in an automobile. The second image is captured by an exterior-facing camera, such as the exterior camera 112 of FIG. 1 and is of a scene that is viewable to the user. As an example, the scene captured in the second image is an area in front of the automobile that can be seen by the user in the automobile. Although the scene is often described as an area in front of the automobile, embodiments are not so limited. Rather, in some embodiments, the scene may be an area to the left or right of or even behind the automobile. In these instances, the interior and exterior cameras are mounted and positioned to capture images of the user and the scene, respectively, relative to the desired direction.

Process 300 continues at block 306, where the first image is analyzed to determine an attention position of the user. In various embodiments, this analysis includes determining the positioning of the user's head and eyes. Once the positioning of the user's head and eyes is known, the user's attention position is determined and from there, the user's attention direction, both in relation to a reference system.

Process 300 proceeds next to block 308, where the second image is analyzed to identify one more objects in a scene in front of the automobile. These identified objects may include billboards, road signs, store signs, advertisements, posters, other automobiles, pedestrians, animals, or other objects Process 300 continues next to block 310, where a relative position of each object in the scene is determined. Examples of this step are presented above. Process 300 proceeds to decision block 312, where a determination is made whether the attention direction of the user corresponds to the relative position of an object in the scene. In some embodiments, this determination is made over the analysis of multiple first and second images captured by the interior and exterior cameras, which is discussed in more detail above.

If the user attention direction corresponds to the relative position of an object, then it is determined that the user is looking at that object and process 300 flows to block 314; otherwise, process 300 flows to decision block 318.

At decision block 318, a determination is made whether an object not being looked at by the user is a hazardous object or an informational sign. For example, if the user is looking at a side mirror but a pedestrian is directly in front of the automobile, then the object (i.e., the pedestrian) may be determined to be a threat to the automobile and thus, a hazardous object. If the user is looking at something in the back seat of the automobile as the automobile is approaching a speed-limit sign, the object (i.e., the speed-limit sign) may be determined to be an informational sign, which may or may not be a hazardous object.

In some embodiments, this determination is made over the analysis of multiple first and second images captured by the interior and exterior cameras, which is discussed in more detail above. In other embodiments, this analysis may also be based on other information associated with the automobile. For example, the head unit may also communicate with other accessories of the automobile to obtain the speed and braking state of the automobile. In this way, the head unit can determine if the object is actually a hazardous object, such as based on the object's relative position to the automobile, the automobile's speed, and whether the user is currently applying the brakes.

If an object is a hazardous object or an informational sign, then process 300 flows to block 314; otherwise, process 300 may return to block 304 to capture additional first and second images from the interior and exterior cameras, respectively.

At block 314, content associated with an object is selected. The type of content selected may be partially determined based on whether the user was looking at the object, as determined at decision block 312, or if the user is not looking at the object but the object is a hazardous object or informational sign, as determined at decision block 318. For example, if the user is looking at the object, and thus the object is an object of interest to the user, then positive content associated with the object can be selected. However, if the user is not looking at the object, then warning content or an alert associated with the object can be selected.

In addition to the examples presented above, in other embodiments, a location of identified objects may be mapped to specific content. When an object is identified in the scene of the second image, current GPS coordinates of the automobile may be used to retrieve content associated with the object's location, whether it is a known address, landmark, or some other distinguishing characteristic. A few examples of such content may include an advertisement or coupon for a restaurant, a location or phone number of the restaurant, a map to the restaurant, a corresponding menu, or hours of operation.

As another example, the object may be a pedestrian or some other hazardous object. The associated content may be a warning that the pedestrian is too close to the automobile or the automobile is on a collision course with the pedestrian. In yet another example, if the object is an informational sign, the associated content may be an alert, such as audible speech, of the information on the sign.

Process 300 proceeds to block 316, where the selected content is presented or otherwise provided to the user. As described herein, the content may be visual content, audio content, tactile content, or some combination thereof. For example, if the user is looking at an object and that object is a billboard for a restaurant, then the selected content may be an address or route to the restaurant. As a result, the head unit may remove or modify the currently displayed content and display the navigation interface with a graphical image of a route from the automobile's current location to the restaurant. In some embodiments, the head unit may also output an audio tone or message indicating how far away the restaurant is or the hours of operation of the restaurant.

As another example, if the user is not looking at an object that poses a threat to the automobile, then the head unit may send a signal to a haptic interface in the steering wheel to vibrate to get the attention of the user. Similarly, a warning light or audio tone or message may be provided to the user to indicate the possibly dangerous object. After block 316, process 300 may return to block 304 to capture additional first and second images from the interior and exterior cameras, respectively.

Although process 300 is described with respect to determining where a single user of the automobile is looking, process 300 may be expanded to perform similar functionality for multiple users in the automobile. For example, the system may be used to determine if the driver of the automobile sees an object for safety purposes and if a passenger is looking at an object of interest for advertising purposes.

Moreover, although process 300 is described as analyzing a single image from both the interior and exterior cameras, embodiments are not so limited. For example, the functionality of process 300 may be expanded to analyze multiple image frames to determine the user's attention direction or the relative position of objects in the scene.

In at least one embodiment, a user may be deemed to be looking at an object if the user is looking at a specific object for a select amount of time. For example, blocks 304, 306, 308, 310, and 312 in process 300 may be performed for a plurality of first images from the interior camera and a plurality of second images from the exterior camera. The functionality of process 300 for these blocks is performed for each separate image, particularly if the user is looking at the same object in the scene, given that its relative position in the second images, as well as the attention direction in the first images, may change over time. In this way, the user's attention direction is tracked over time with respect to the tracked position of objects in the scene, and if the user is looking at the same object for a given amount of time or across a select number of image frames, then the user is looking at or otherwise focusing on that object. Content can then be selected at block 314 based on that object. In this way, the system does not select content for the user if the user simply looks at an object or the user's eyes glance over an object while looking around, such as by checking on a side mirror. Rather, content is selected for those objects in which the user shows an interest by looking at the object for a prolonged period of time.

Similarly, multiple images can be analyzed to determine if the user is missing or not looking at an object for a select amount of time. Again, the user's attention direction is tracked over time with respect to the tracked position of objects in the scene and if the user is not looking at a hazardous object or an informational sign for a given amount of time or across a select number of image frames, then the user is determined to be missing the hazardous object or informational sign. Content can then be selected based on that object. In this way, the system does not select content for the user if the user simply looked away from a hazardous object or informational sign to look at something else, such as by checking on a side mirror or blind spot. Rather, content is selected for those hazardous objects or informational signs that the user is missing for a prolonged period of time and should be warned.

As described above, multiple attention levels may be utilized to determine if and how much a user is devoting their attention to an object. In some embodiments, the user or an administrator selects an attention level that triggers an indication that the user is looking at or missing an object such that corresponding content is selected and presented to the user. Such user or administrator selection may be performed either at an initialization stage of the head unit or dynamically via a modification to the head unit settings.

In some embodiments, the user or administrator can select different thresholds for the different types of objects. For example, the user can select the stare threshold to be utilized for objects of interest such that content associated with an identified object of interest is selected if the user stares at the object but not if the user glimpses, glances, or gazes at the object. Conversely, an administrator may select the gaze threshold to be utilized to determine if the user is looking at a hazardous object such that content associated with the hazardous object is selected if the user glimpses or glances at the object but not if the user gazes or stares at the object.

In other embodiments, the user or administrator can select one or more different thresholds for specific types of objects, which may indicate the amount or type of content presented to the user. For example, the stare threshold may be utilized to select mapping content such that the head unit displays a map to a store being advertised by the object. In comparison, the glance threshold may be utilized to send a text message to the user's mobile device with the name of the store. Thus, the different attention levels can be used to select different levels or type of content and how they are presented to the user.

Furthermore, although process 300 is described as presenting content to the user, the information gathered, analyzed, and determined throughout process 300 can be utilized for additional purposes. For example, embodiments described herein can be expanded to can track the number of times a driver checks the side mirrors or how long he/she looks at the radio or whether the driver is looking at a cellular/smart phone. Accordingly, a report card of how attentive the driver is towards objects surrounding the automobile can be generated, which can provide monitoring of driving fleets or teenage drivers.

In some embodiments, the user's attention direction determined at block 306 can be compared to known positions of objects within the automobile (e.g., side mirrors or radio) to determine if and how long the user is looking at known objects. In other embodiments, the first image or other images from other interior cameras may be analyzed for banned objects or distracted drivers (e.g., is the user's attention direction in line with a smart phone). This additional information can be further added to the driver report card or provided to third party entities, such as insurance companies, rental car companies, police authorities, etc.

By determining if the user is looking at the road, looking at a phone, or looking at safety objects (e.g., a rearview mirror of the automobile, a speedometer of the automobile, a windshield of the automobile), a driver's behavior fingerprint can be generated over time. Third-party entities can provide or adjust coverage or services based on the driver's behavior fingerprint. If the user is routinely looking at the mirror and not looking at a smart phone, then an insurance company or a rental car company can increase a driver-safety rating for the driver, which can be used to lower premiums or provide good driver incentives. Conversely, if the driver is not looking at their side mirrors or is focused on some aspect other than driving, then the insurance company or rental car company can decrease the driver's safety rating, which can increase premiums. Thus, incentives can be generated and provided to people who look at safety objects of the automobile at select time intervals, which can improve the driver's overall operation of the automobile.

Similar embodiments can be utilized to detect the driver's reaction to specified driving events. For example, a plurality of exterior images may be captured showing another automobile cutting off the automobile. A plurality of interior images may be simultaneously captured showing the driver as becoming angry or grabbing a weapon. In this example scenario, a road-rage alert may be provided to the driver to calm the driver down, or the police may be notified of the possible road rage incident.

Figure 4:
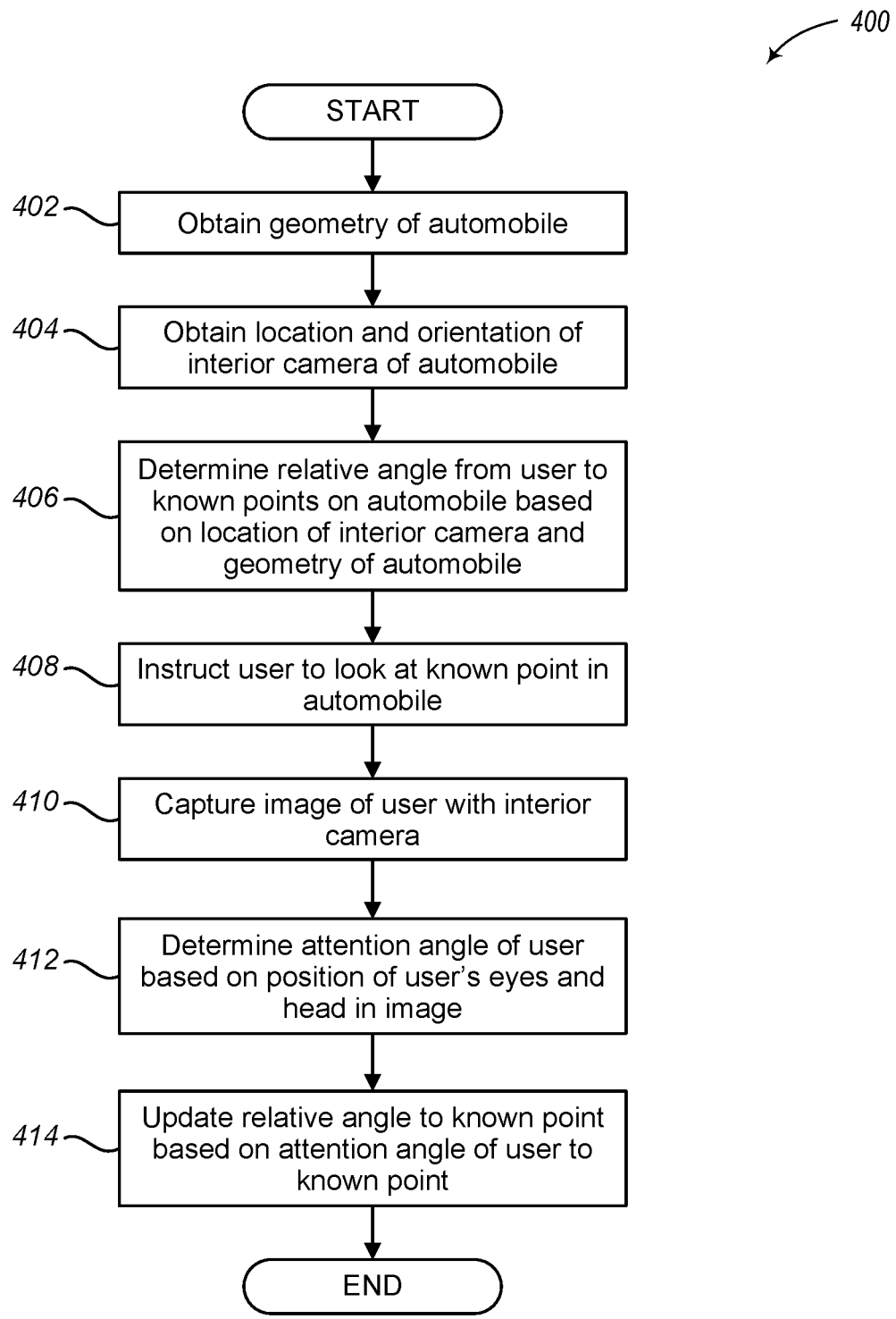
FIG. 4 illustrates a logical flow diagram generally showing one embodiment of a process for calibrating the user's attention relative to a known point in the automobile in accordance with embodiments described herein.

FIG. 4 illustrates a logical flow diagram generally showing one embodiment of a process for calibrating the user's attention relative to a known point in the automobile in accordance with embodiments described herein. The description presented under this process may assist in setting a reference system for determining an attention position or attention direction or serve as an alternative to the examples already provided above. This process is not necessarily limited to the chronological order shown here and may be executed without adhering to all the steps described here or with steps that are beyond those in this diagram. To be clear, process 400 is merely an example of a flow that may be applicable to or adopt the principles described above.

Process 400 begins, after a start block, at block 402, where the geometry of the automobile is obtained. In some embodiments, the automobile geometry is obtained from the automobile manufacturer, such as via a remote server. In other embodiments, the automobile geometry may be pre-programmed into the head unit. The automobile geometry includes various dimensions, angles, or placement of objects with a fixed or permanent position on the automobile. Examples include the distance between side mirrors, a position of the head unit relative to the side mirrors, an estimated distance and angle between a driver and the side mirrors, an estimated distance and angle between the driver and the head unit, etc.

Process 400 proceeds to block 404, where a location and an orientation of an interior camera, such as interior camera 110, are obtained. Similar to the automobile geometry, the interior camera location and orientation may be obtained from the automobile manufacturer via a remote server or it may be preprogramed into the head unit. In some other embodiments, the user may input the location and orientation of the interior camera into the head unit, such as if the system is an after-market installation into the automobile. In yet other embodiment, the interior camera may include one or more sensors to detect its location and orientation within the automobile, such as a tilt sensor and one or more distance sensors. In some other embodiments, an image from the interior camera may be captured and analyzed to identify the location and orientation of known objects within the automobile, such as the side and location of the driver seat head rest. Such information can be used, along with the automobile geometry, to calculate the relative position of the interior camera.

Process 400 continues at block 406, where the relative angle from the user to one or more known points on the automobile are determined. Various known geometry and mathematical algorithms may be employed to determine each relative angle from the user to corresponding known points in the automobile based on the location of the interior camera with respect to the geometry of the automobile. In some embodiments, an initial user-positioning image may be captured of the user via the interior camera to determine an approximate position of the user within the automobile relative to the interior camera.

Process 400 proceeds next to block 408, where the user is instructed to look at a known point in the automobile. In various embodiments, the head unit may output a visual or audible instruction for the user to follow, such as "please look at the right-side mirror."

Process 400 continues next at block 410, where an image of the user is captured with the interior camera. In various embodiments, the image of the user may be captured a selected amount of time after the instruction to look at a known point is presented to the user. In this way, the user has time to react to the instruction and look at the known point before the image is captured.

Process 400 proceeds to block 412, where an attention angle of the user is determined based on a position of the user's eyes and head in the captured image. In various embodiments, block 412 may employ embodiments of block 306 to determine the attention angle of the user.

Process 400 continues at block 414, where the relative angle between the known point the user is looking at is updated based on the attention angle of the user. For example, if the relative angle between the user and the known point, based on the automobile geometry, is 14 degrees to the right and 5 degrees down, but the attention angle of the user is 13 degrees to the right and 7 degrees down, then the relative angle can be updated to be the same as the attention angle or some combination thereof, such as average. In this way, the system calibrates the user's head and eye movement relative to the interior camera. After block 414, process 400 terminates or otherwise returns to a calling process to perform other actions.

Although not illustrated, in some embodiments, the system may perform additional calibrations between the interior camera and an exterior camera. In at least one embodiment, the position and orientation of the interior camera may be correlated to the position and orientation of the exterior camera, such as based on the known position of the interior camera with a known position of the exterior camera. In this way, the relative angle determined at block 414 can be further refined and calibrated to an orientation point of the exterior camera, which aids in the alignment with the attention direction of the user and the captured scene of the viewable area to the user.

Figure 5:
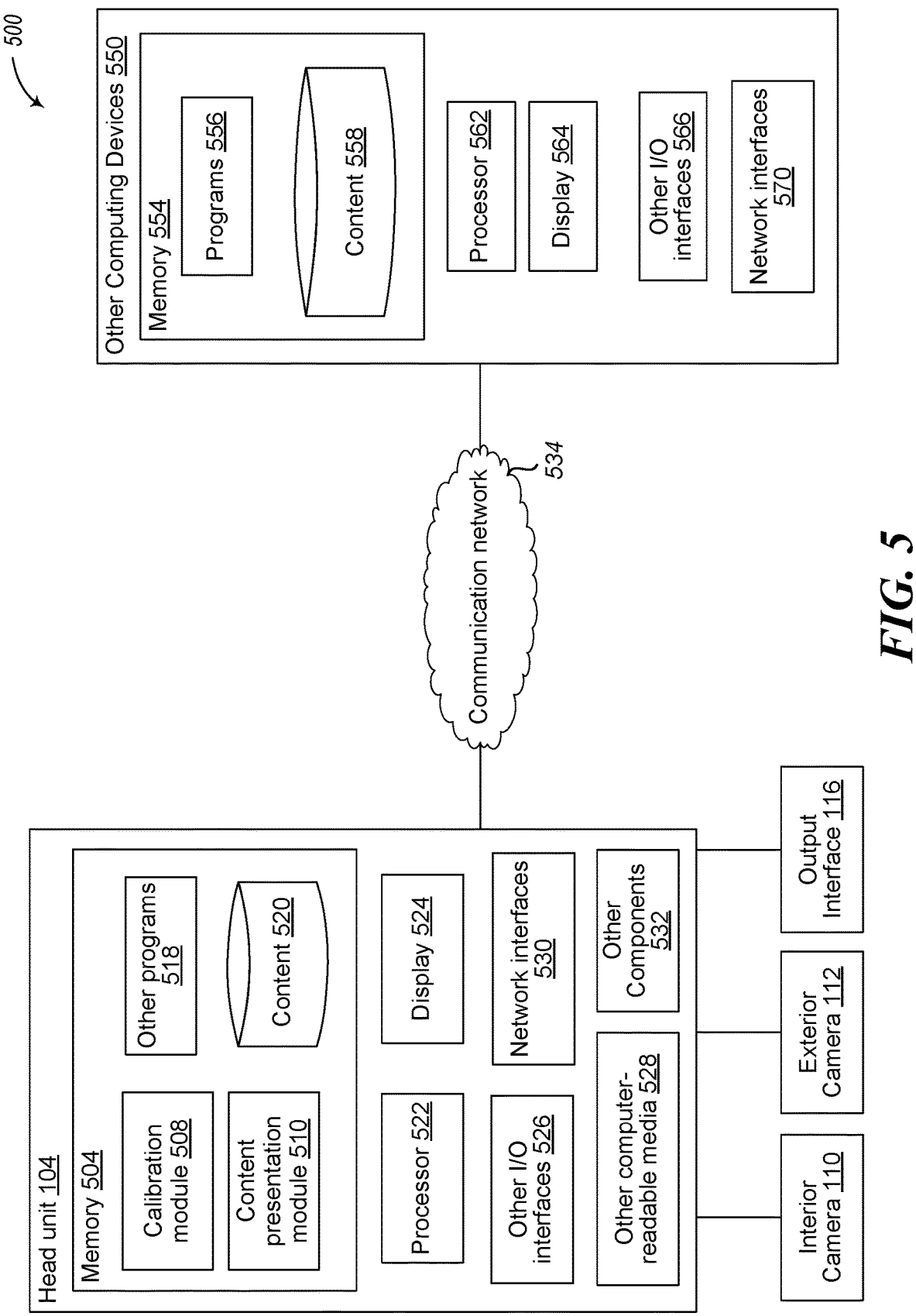
FIG. 5 shows a system diagram that describes one implementation of computing systems for implementing embodiments described herein.

FIG. 5 shows a system diagram that describes one implementation of computing systems for implementing embodiments described herein. System 500 includes head unit 104, and optionally one or more other computing devices 550.

As described herein, head unit 104 is a computing device that can perform functionality described herein for determining where a user is looking and selecting associated content for presentation to the user. One or more special-purpose computing systems may be used to implement the head unit 104. Accordingly, various embodiments described herein may be implemented in software, hardware, firmware, or in some combination thereof. The head unit 104 includes memory 504, one or more processors 522, display 524, input/output (I/O) interfaces 526, other computer-readable media 528, network interface 530, and other components 532. The head unit 104 is also in communication with interior camera 110, exterior camera 112, and output interface 116, which may be separate from or external to the head unit 104. In some embodiments, the interior camera 110, the exterior camera 112, the output interface 116, or some combination thereof, may be embedded in or otherwise incorporated in head unit 104, such as other components 532.

Processor 522 includes one or more processing devices that execute computer instructions to perform actions, including at least some embodiments described herein. In various embodiments, the processor 522 may include one or more central processing units ("CPU"), programmable logic, or other processing circuitry.

Memory 504 may include one or more various types of non-volatile and/or volatile storage technologies. Examples of memory 504 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 504 may be utilized to store information, including computer-readable instructions that are utilized by processor 522 to perform actions, including at least some embodiments described herein.

Memory 504 may have stored thereon various modules, such as calibration module 508 and content presentation module 510. The calibration module 508 provides functionality to calibrate the positioning and angles between the user of the automobile, the interior camera 110, and the exterior camera 112. The content presentation module 510 provides functionality to detect a user's attention position and attention direction and the position of objects in a scene in the viewable area of the user. In some embodiments, the content presentation module 510 requests associated content from another computing device, such as other computing devices 550, which may include remote server 124 in FIG. 1. In other embodiments, the content presentation module 510 itself selects the associated content. Once selected or received, the content presentation module 510 provides the content to the user, such as via display 524, other components 532, or output interface 116.

Memory 504 may also store other programs 518 and other content 520. Other programs 518 may include operating systems, user applications, or other computer programs. Content 520 may include visual, audio, or tactile content to provide to the user, as described herein.

Display 524 is a display device capable of rendering content to a user. In various embodiments, the content selected by the content presentation module 510 is presented to the user via the display 524. The display 524 may be a liquid-crystal display, light-emitting diode, or other type of display device, and may include a touch-sensitive screen capable of receiving inputs from a user's hand, stylus, or other object.

I/O interfaces 526 may include interfaces for various other input or output devices, such as audio interfaces, other video interfaces, USB interfaces, physical buttons, keyboards, or the like. In some embodiments, the I/O interfaces 526 provide functionality for the head unit 104 to communicate with the interior camera 110, the exterior camera 112, or the output interface 116.

The interior camera 110 is a camera positioned and configured to capture images of an interior of an automobile associated with the head unit 104. The exterior camera 112 is a camera positioned and configured to capture images of an exterior of the automobile associated with the head unit 104, such that a viewable area of the user is captured in the images. The output interface 116 may include display devices, audio output devices, or haptic interface devices for providing visual, audible, or tactile content, respectively, to the user of the automobile.

Other computer-readable media 528 may include other types of stationary or removable computer-readable media, such as removable flash drives, external hard drives, or the like.

Network interfaces 530 are configured to communicate with other computing devices, such as the other computing devices 550, via a communication network 534. Network interfaces 530 include transmitters and receivers (not illustrated) to send and receive data as described herein. The communication network 534 may include the communication network 122 or the mobile device communication network 120 of FIG. 1.

The other computing devices 550 are computing device that are remote from the head unit 104, and in some embodiments, can perform functionality described herein for determining where a user is looking and selecting associated content for presentation to the user. The other computing devices 550 may include remote server 124 or mobile device 114 in FIG. 1.

One or more special-purpose computing systems may be used to implement the other computing devices 550. Accordingly, various embodiments described herein may be implemented in software, hardware, firmware, or in some combination thereof.

The other computing devices 550 includes memory 554, one or more processors 562, display 564, I/O interfaces 566, and network interface 570, which may be similar to or incorporate embodiments of memory 504, processor 522, display 564, I/O interfaces 526 and network interface 570 of head unit 104, respectively. Thus, processor 562 includes one or more processing devices that execute computer instructions to perform actions, including at least some embodiments described herein. In various embodiments, the processor 522 may include one or more CPUs, programmable logic, or other processing circuitry. Memory 554 may include one or more various types of non-volatile and/or volatile storage technologies. Memory 554 may be utilized to store information, including computer-readable instructions that are utilized by processor 562 to perform actions, including at least some embodiments described herein. Memory 554 may also store programs 556 and content 558. The programs 556 may include a content selection module, not illustrated, similar to content presentation module 510 that selects and provides content to the head unit 104 based on information received from the head unit 104.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A system, comprising:
a memory that is configured to store computer instructions;
an output interface that is configured to present sensory content to a driver of an automobile;
a first camera that is part of the automobile and is configured to capture images of the driver of the automobile;
a second camera that is part of the automobile and is configured to capture images of a scene that the driver is viewing in front of the automobile;
a processor that is configured to execute the computer instructions and:
obtain a plurality of first images of the driver captured by the first camera;

determine an attention direction of the driver based on a position of at least one of the driver's eyes or head in the plurality of first images;

obtain a plurality of second images of the scene in front of the automobile captured by the second camera during a same time period as the plurality of first images;

identify at least one object in the scene based on an analysis of the plurality of second images;

determine a relative position of the at least one object in the scene;

identify an object of interest from the at least one object that the driver is looking at based on a correlation between the attention direction of the driver and the relative position of the object of interest in the scene;

determine, from a plurality of attention levels, an attention level of the driver in the object of interest based on a combination of a number of times the driver looked at the object of interest and an amount of time the driver looked at the object of interest for each time the driver looked at the object of interest;

determine a type of content from a plurality of types of content based on the determined attention level, wherein each attention level of the plurality of attention levels corresponds to a different type of content of the plurality of types of content;

select an item of content to provide to the driver based on the determined type of content and the object of interest that the driver is looking at; and present the selected item of content to the driver via the output interface.

2. The system of claim 1, wherein the output interface is a display device configured to display visual content to the driver, a speaker configured to output audio content, or a haptic interface configured to provide tactile content to the driver.

3. A method to provide content to a person in an automobile via a head unit of the automobile, comprising:

capturing a first pair of images having a first image being of the person and a second image being of an area viewable by the person at a first time analyzing the first and second images of the first pair of images to determine a first attention direction of the person and a relative position of one or more first objects in the viewable area;

determining that the person is looking at a first target object of the one or more first objects based on a comparison of the first attention direction of the person and the relative position of the first objects;

capturing a second pair of images having a first image being of the person and a second image being of the area viewable by the person at a second time that is later than the first time;

analyzing the first and second images of the second pair of images to determine a second attention direction of the person and a relative position of one or more second objects in the viewable area;

determining the person is looking at a second target object of the one or more second objects based on a comparison of the second attention direction of the person and the relative position of the second objects;

in response to a determination that the first target object and the second target object is a same object:

determining, from a plurality of attention levels, an attention level of the person to the first target object and to the second target object based on a sequence of a number of times the person looked at the first target object and the second target object in combination with an amount of time the person looked at the first target object and the second target object;

determining a type of content from a plurality of types of content based on the determined attention level, wherein each attention level of the plurality of attention levels corresponds to a different type of content of the plurality of types of content;

selecting content of the determined type of content associated with the first target object to provide to the person; and providing the content to the person.

4. The method of claim 3, wherein determining the attention level further comprises:

determining the attention level of the person to the first target object and to the second target object based on an amount of time between the capturing of the first pair of images and the capturing of the second pair of images.

5. The method of claim 3, wherein determining the attention level of the person includes:

determining the attention level based on a sequence of a plurality of viewing actions selected from a group consisting of at least one glimpse, at least one glance, at least one gaze, and at least one stare, wherein a glimpse is the person sweeping their eyes across an object without pausing, a glance is the person's eyes being positioned to look at the object for a first amount of time equal to or greater than a first threshold and less than a second threshold; a gaze is the person's eyes being positioned to look at the object for a second amount of time equal to or greater than the second threshold and less than a third threshold, and a stare is the person's eyes being positioned to look at the object for a third amount of time equal to or greater than the third threshold.

6. The method of claim 3, further comprising:

determining that the person is looking at a safety object of the automobile based on the attention direction of the person and a location of known safety objects of the automobile; and generating an incentive for the person based on the determination that the person is looking at the safety object.

7. The method of claim 6, wherein the safety object is a side mirror of the automobile, a rearview mirror of the automobile, a speedometer of the automobile, or a windshield of the automobile.

8. The method of claim 3, wherein providing the content to the person includes sending the content to a mobile computing device of the person.

9. A head unit of an automobile, comprising:

a display device that is configured to display visual content;

a memory that is configured to store computer instructions; and a processor that is configured to execute the computer instructions and:

receive a plurality of first images from an interior-facing camera in the automobile;

receive a plurality of second images from an exterior-facing camera on the automobile;

determine a focus area of a user in the automobile based on a direction of the user's attention detected from the plurality of first images;

identify an object associated with the user's attention based on an analysis of the plurality of second images;

determine, from a plurality of attention levels, an attention level of the user based on a combination of a number of times the user looked at the identified object and an amount of time the user looked at the identified object for each time the user looked at the identified object;

determine a type of content from a plurality of types of content based on the determined attention level, wherein each attention level of the plurality of attention levels corresponds to a different type of content of the plurality of types of content select visual content to display on the display device based on the determined type of content and the identified object; and provide the selected visual content to the display device for display to the user.

10. The system of claim 1, wherein the processor determines the attention level of the driver in the object of interest by being further configured to execute the computer instructions and determine the attention level based on a sequence of multiple viewing actions taken by the driver in looking towards and away from the object of interest.

11. The system of claim 1, wherein the processor determines the attention level of the driver in the object of interest by being further configured to execute the computer instructions and determine the attention level based on the driver looking at the object of interest in response to a passenger looking at the object of interest and then speaking to the driver.

12. The system of claim 1, wherein the processor determines the attention level of the driver in the object of interest by being further configured to execute the computer instructions and determine the attention level based on the driver gesturing towards the object of interest.

13. The system of claim 1, wherein the processor determines the attention level of the driver in the object of interest by being further configured to execute the computer instructions and aggregate the attention level of the driver with a second attention level of a passenger of the automobile with the object of interest.

* * * * *